United States Patent
Hayashi et al.

(10) Patent No.: US 12,551,755 B2
(45) Date of Patent: Feb. 17, 2026

(54) CALCULATION DEVICE, CALCULATION SYSTEM, CALCULATION METHOD, AND CALCULATION PROGRAM

(71) Applicant: Qoncept, Inc., Tokyo (JP)

(72) Inventors: Kenichi Hayashi, Tokyo (JP); Shunsuke Nambu, Tokyo (JP)

(73) Assignee: Qoncept, Inc., Tokyo (JP)

( * ) Notice: Subject to any disclaimer, the term of this patent is extended or adjusted under 35 U.S.C. 154(b) by 750 days.

(21) Appl. No.: 17/960,347

(22) Filed: Oct. 5, 2022

(65) Prior Publication Data

US 2023/0218946 A1   Jul. 13, 2023

Related U.S. Application Data

(63) Continuation of application No. PCT/JP2022/000444, filed on Jan. 10, 2022.

(51) Int. Cl.
*A63B 24/00* (2006.01)
*A63B 69/36* (2006.01)
(Continued)

(52) U.S. Cl.
CPC ...... *A63B 24/0003* (2013.01); *A63B 24/0021* (2013.01); *A63B 69/3658* (2013.01);
(Continued)

(58) Field of Classification Search
CPC ............ A63B 24/0003; A63B 24/0021; A63B 69/3658; A63B 2024/0031; A63B 2220/05; A63B 2220/16; A63B 2220/20; A63B 2220/30; A63B 2220/807; A63B 69/36; A63B 2024/0028; G06T 7/20; G06T 7/70; G06T 2207/30196; G06T 2207/30224;
(Continued)

(56) References Cited

U.S. PATENT DOCUMENTS 5,342,051 A * 8/1994 Rankin .............. A63B 24/0021
                                                 473/409
7,214,138 B1 * 5/2007 Stivers ............... A63B 69/3614
                                                 473/199
(Continued)

FOREIGN PATENT DOCUMENTS

JP    2010082430    4/2010
JP    2012093931    5/2012
(Continued)

OTHER PUBLICATIONS

Jonas Skold, Estimating 3D-trajectories from Monocular Video Sequences, Degree Project in Computer Science and Communication, Second Level, Stockholm, Sweden (2015).
(Continued)

*Primary Examiner* — Nini F Legesse
(74) *Attorney, Agent, or Firm* — Trojan Law Offices

(57) ABSTRACT

A trajectory and a flight distance of a target moving body such as a ball hit by a golf club in an athletic competition such as a golf game may be calculated from the images having been taken. The calculation may be conducted from the pictures having been taken with a monocular camera of low resolution such as a smartphone. An initial velocity and a hitting angle of a target moving body such as a ball having been hit high by the golf club may be calculated.

14 Claims, 11 Drawing Sheets

(51) Int. Cl.
*G06T 7/20* (2017.01)
*G06T 7/70* (2017.01)
*G06V 20/40* (2022.01)
*G06V 40/20* (2022.01)

(52) U.S. Cl.
CPC .................. *G06T 7/20* (2013.01); *G06T 7/70* (2017.01); *G06V 20/46* (2022.01); *G06V 40/23* (2022.01); *A63B 2024/0031* (2013.01); *A63B 2220/05* (2013.01); *A63B 2220/16* (2013.01); *A63B 2220/20* (2013.01); *A63B 2220/30* (2013.01); *A63B 2220/807* (2013.01); *G06T 2207/30196* (2013.01); *G06T 2207/30224* (2013.01); *G06T 2207/30241* (2013.01)

(58) Field of Classification Search
CPC . G06T 2207/30241; G06T 2207/10016; G06T 7/60; G06T 7/246; G06T 2207/30221; G06V 20/46; G06V 40/23; G01P 3/38
USPC ................. 473/199, 200, 233, 266, 406–409
See application file for complete search history.

(56) References Cited

U.S. PATENT DOCUMENTS

| | | | | |
|---|---|---|---|---|
| 7,394,917 | B2* | 7/2008 | Asakura | G06T 7/254 |
| | | | | 382/107 |
| 2004/0032970 | A1 | 2/2004 | Kiraly | |
| 2006/0008116 | A1* | 1/2006 | Kiraly | G06T 7/20 |
| | | | | 382/103 |
| 2012/0106869 | A1 | 5/2012 | Machitani et al. | |
| 2012/0306892 | A1* | 12/2012 | Hui | G09B 19/0038 |
| | | | | 345/474 |
| 2013/0038718 | A1 | 2/2013 | Nakagome | |
| 2014/0028838 | A1* | 1/2014 | Okur | G01P 3/68 |
| | | | | 348/135 |
| 2014/0378194 | A1* | 12/2014 | Bentley | A63F 13/86 |
| | | | | 463/3 |
| 2017/0083748 | A1* | 3/2017 | Zhou | G06F 18/211 |
| 2019/0147219 | A1 | 5/2019 | Thornpbrue et al. | |
| 2019/0269994 | A1* | 9/2019 | Okazaki | A63B 69/3658 |
| 2020/0398138 | A1* | 12/2020 | Hendrix | A63F 13/812 |
| 2020/0406098 | A1* | 12/2020 | Bartholomew | A63B 71/0622 |

FOREIGN PATENT DOCUMENTS

| | | |
|---|---|---|
| JP | 2013036846 | 2/2013 |
| JP | 2021103483 | 7/2021 |
| JP | 2021108015 | 7/2021 |
| WO | WO03104838 | 12/2003 |

OTHER PUBLICATIONS

Notice of Submission of Opinion Re Application No. 1020237002224, KR Patent Office (Aug. 27, 2025).

* cited by examiner

CALCULATION DEVICE, CALCULATION SYSTEM, CALCULATION METHOD, AND CALCULATION PROGRAM

CROSS-REFERENCES OF RELATED APPLICATIONS

The present application is a continuing application of the international patent application PCT/JP2022/444 filed on Jan. 10, 2022 and designating the United States of America. The present application is based on and claims the benefits of priorities from the international application PCT/JP2022/444, the entire contents of which are incorporated herein by reference.

TECHNICAL FIELD

The present disclosure relates to a calculation device, a calculation method, and a calculation program.

BACKGROUND ART

There is a need to calculate a trajectory and a flight distance of a target moving body such as a ball having been hit high with equipment such as a golf club in an athletic competition such as a golf competition from taken (or shot) pictures. In particular, it is demanded to calculate the trajectory and the flight distance of the target moving body with high accuracy from pictures taken (or shot) with a monocular camera of low resolution while the easily-handled photographing equipment and material such as a smartphone have become widely used in recent years.

For such a demand, a technology to calculate the trajectory and the flight distance from pictures in which the trajectory of the target moving body was taken with the monocular camera from the traverse direction (e.g., from the front side of the golfer in an example case of golf) has been disclosed. For example, there are technologies disclosed in JP 2021-093931, A.

And a technology to calculate the trajectory and the flight distance of the target moving body from pictures taken with the monocular camera facing the direction in which the body was hit (or shot) (e.g., the camera being set oriented to face the ball to be hit (or shot) and against the hitting (or shooting) direction of the ball along the lateral direction of the golfer in an example case of golf) has been disclosed. For example, there are technologies disclosed in JP 2021-108015, A.

SUMMARY OF THE INVENTION

However, there is an issue that it is difficult to detect the target body by the prior art method. To make a concrete explanation with respect to the golf, by way of example, in the case of technology where pictures taken from the front side of the golfer are used as described in the patent reference 1, it is necessary to detect a small white ball from a picture including a background where trees, spectators, and so on may be often included. And in the case of technology where pictures taken with a camera set oriented to face the ball to be hit and against a hitting direction of the ball along the lateral direction of the golfer as described in the patent reference 2, it would be even more difficult to detect the ball not only because trees, spectators, and so on may be included in the background, but also because an image of the ball would become smaller as the time goes by since the ball flies farther away from the camera.

On the other hand, it may be easy to detect even a small white ball as the target body because the background may be the ground surface (lawn in many cases) in an example case of golf, if the body is taken (or shot) from the above of the body (the direction from the sky to the ground surface). Even from pictures taken (or shot) with a monocular camera of low resolution, it may be easy to detect the target moving body without using a high-level detection technology. And although it may involve higher difficulty in obtaining directly the trajectory and the flight distance of the target body from the pictures taken (or shot) from the above of the body, the trajectory and the flight distance of the target body can be obtained easily based on the laws of physics if the initial velocity and the hitting angle (elevation angle) at the time of hitting (or shooting) the target body can be calculated.

Then, in the present invention, it is an object to provide a device, a method, a program, and a system to calculate an initial velocity and a hitting angle of a target body having been hit (or shot) using pictures taken (or shot) with a monocular camera from the above of the body.

A calculation device, as an aspect of the present invention, is characterized by comprising: a calculation device to calculate an initial velocity and a hitting (or shooting) angle of a target moving body having been hit (or shot) from information of a plurality of image frames taken (or shot) from above with a monocular camera, the calculation device comprising: a detecting unit to detect the target moving body from the information of the plurality of image frames; a position calculating unit to calculate a three-dimensional position of the target moving body detected by the detecting unit; an initial velocity calculating unit to calculate an initial velocity of the target moving body from a three-dimensional position of the target moving body calculated by the position calculating unit and the information of the plurality of image frames; and a hitting angle calculating unit to calculate a hitting angle of the target moving body from the three-dimensional position of the target moving body calculated by the position calculating unit and the information of the plurality of image frames.

In an aspect of the present invention, the calculation device is characterized in that the plurality of image frames comprise a plurality of image frames being consecutive and taken (or shot) with a constant time interval and that the position calculating unit calculates a position by approximating the motion of the target moving body as a uniform linear motion.

In an aspect of the present invention, the calculation device is characterized in that the position calculating unit comprises: an existence straight line calculating unit to calculate an existence straight line connecting a three-dimensional position of an image of the target moving body taken (or captured) in an image frame and a three-dimensional position of an optical center of a lens of the monocular camera; and an existence surface calculating unit to calculate an existence surface on which the target moving body may exist with some probability, and wherein a three-dimensional position of a point at which the existence straight line calculated by the existence straight line calculating unit and the existence surface calculated by the existence surface calculating unit intersect.

In an aspect of the present invention, the calculation device is characterized in that the position calculating unit calculates a candidate of a three-dimensional position at which the target moving body may exist with the highest probability as a three-dimensional position of the target moving body through a search algorithm from a plurality of candidates of three-dimensional positions at which the target moving body may exist with some probability.

In an aspect of the present invention, the calculation device is characterized in that the position calculating unit searches a candidate of a three-dimensional position at which the target moving body may exist with the highest probability by evaluating an evaluation value obtained from three-dimensional distances of candidates of three-dimensional positions at which the target moving body taken (or captured) in image frames may exist with some probability.

In an aspect of the present invention, the calculation device is characterized by comprising: a trajectory calculating unit to calculate a trajectory in three dimensions of the target moving body from an initial velocity of the target moving body calculated by the initial velocity calculating unit and a hitting angle of the target moving body calculated by the hitting angle calculating unit.

In an aspect of the present invention, the calculation device is characterized by comprising: a flight distance calculating unit to calculate a flight distance of the target moving body from an initial velocity of the target moving body calculated by the initial velocity calculating unit and a hitting angle of the target moving body calculated by the hitting angle calculating unit.

In an aspect of the present invention, a calculation system is characterized by comprising: a monocular camera arranged at a position where the monocular camera takes (or shoot) a picture of the target moving body from up above the target moving body and a calculation device.

In an aspect of the present invention, a calculation method is characterized by comprising: a calculation method to calculate an initial velocity and a hitting angle of a target moving body having been hit (or shot) from information of a plurality of image frames taken (or shot) from above with a monocular camera, the calculation method comprising: a detecting step of detecting the target moving body from information of image frames; a position calculating step of calculating a three-dimensional position of the target moving body detected in the detecting step; an initial velocity calculating step of calculating an initial velocity of the target moving body from a three-dimensional position of the target moving body calculated in the position calculating step and information of image frames; and a hitting angle calculating step of calculating a hitting angle of the target moving body from a three-dimensional position of the target moving body calculated in the position calculating step and information of image frames.

In an aspect of the present invention, a calculation program is characterized by comprising: a calculation program to cause a computer to calculate an initial velocity and a hitting angle of a target moving body having been hit (or shot) from information of a plurality of image frames taken (or shot) from above with a monocular camera, the calculation program causing the computer to execute a detecting step of detecting the target moving body from information of the image frames; a position calculating step of calculating a three-dimensional position of the target moving body detected in the detecting step; an initial velocity calculating step of calculating the initial velocity of the target moving body from the three-dimensional position of the target moving body calculated in the position calculating step and information of the image frames; and a hitting angle calculating step of calculating the hitting angle of the target moving body from the three-dimensional position of the target moving body calculated in the position calculating step and information of image frames.

In an aspect of the present invention, a computer-readable recording medium recording a calculation program is characterized by comprising: a computer-readable recording medium to record the calculation program to cause a computer to calculate an initial velocity and a hitting angle of the target moving body from information of a plurality of image frames taken (or shot) from above with a monocular camera, the calculation program causing the computer to execute a detecting step of detecting the target moving body from information of the image frames; a position calculating step of calculating a three-dimensional position of the target moving body detected in the detecting step; an initial velocity calculating step of calculating an initial velocity of the target moving body from the three-dimensional position of the target moving body calculated in the position calculating step and the information of the image frames; and a hitting angle calculating step of calculating a hitting angle of the target moving body from the three-dimensional position of the target moving body calculated in the position calculating step and the information of the image frames.

According to the present invention, in an athletic competition such as golf, the initial velocity and the hitting angle of the target moving body such as a ball having been hit high with golf equipment such as a golf club can be calculated with high accuracy even from pictures taken (or shot) with the monocular camera of low resolution.

EMBODIMENT FOR CARRYING OUT THE INVENTION

Embodiments of the present invention will be explained with reference to the drawings. Here, duplicated explanations will be omitted and the same symbols are assigned to the same or corresponding parts throughout the drawings.

In an embodiment of the present invention, a calculation device, a calculation method, a calculation program, and a calculation system can calculate an initial velocity and a hitting angle of a target moving body such as a ball having been hit high with equipment such as a golf club in an athletic competition such as golf even from pictures taken (or shot) with a monocular camera of low resolution by calculating them from information of a plurality of image frames taken (or shot) from the above.

With respect to the present invention, in an embodiment, to consider easiness of understanding the explanation, it is assumed that a golf ball having been hit (or shot) in the golf is a target moving body such that an example of calculating an initial velocity and a hitting angel of the target moving body in three dimensions from information of a plurality of image frames taken (or shot) from the above with a monocular camera is explained. Here, it should be noted that this is merely an example and the application of the present invention is not limited only to the golf.

Embodiment 1

As disclosed as Embodiment 1 of the present invention, an example in which a calculation device, a calculation method, a calculation program, and a calculation system directly calculate a three dimensional position of a target moving body from information of a plurality of image frames taken (or shot) from the above with a monocular camera is disclosed. In addition, in Embodiment 1, there is disclosed an example in which calculation is made by approximating a motion of the target moving body as a uniform linear motion with respect to the calculation of the three-dimensional position of the target moving body.

Figure 1:
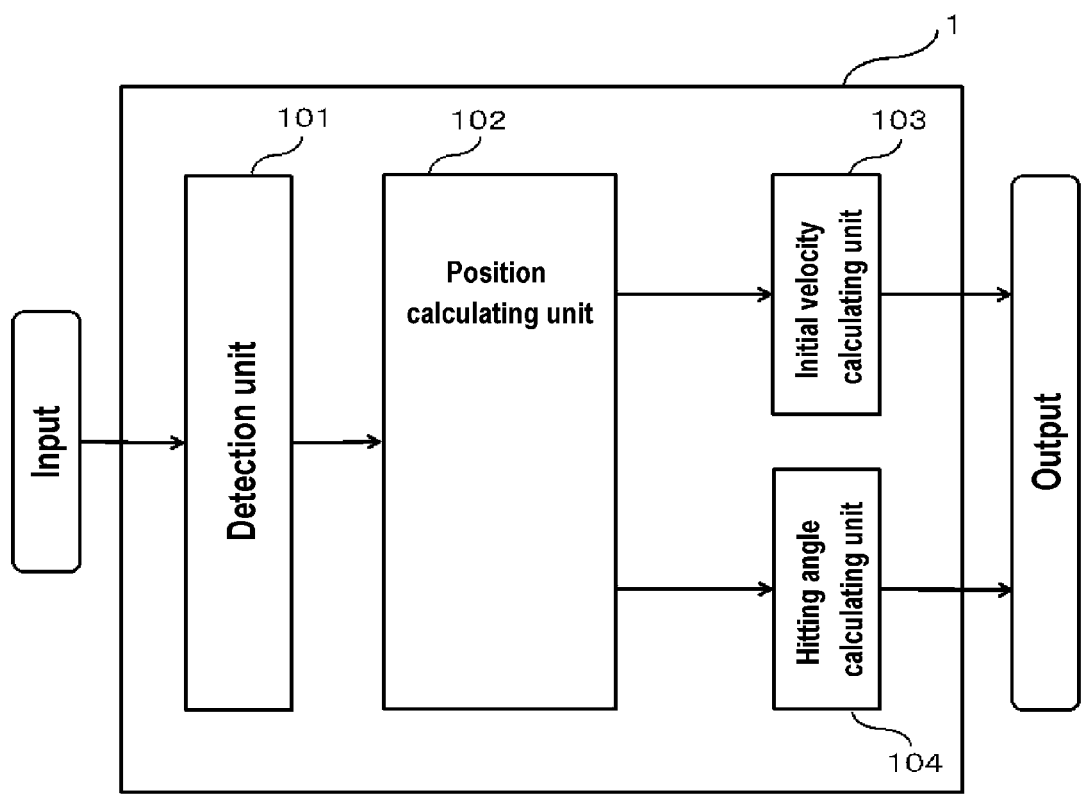
FIG. 1 shows a block diagram of a calculation device.

Firstly, a calculation device is explained. FIG. 1 shows a block diagram of the calculation device. The calculation device 1 may be configured as a stand-alone device in an embodiment and may also be configured and used as being incorporated into another device in another embodiment. The other device that incorporating the calculation device 1 may be, for example, an electric appliance such as a smart-phone, an information mobile terminal, a digital camera, a game terminal, and a television. The calculation device 1 is configured as a computer including, physically, a central processing unit (CPU) 201, an input device 202, an output device 203, a main memory (RAM/ROM) 204, and an auxiliary storage device 205.

Figure 2:
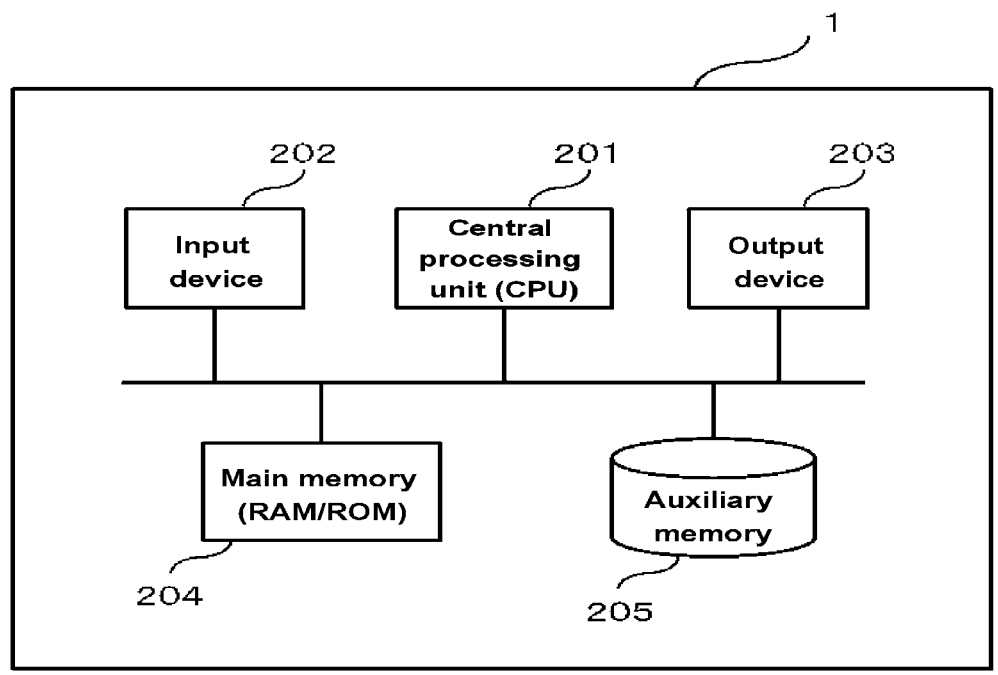
FIG. 2 shows a hardware configuration diagram of the calculation device.

With respect to the computer comprising: the central processing unit (CPU) 201, the main memory (RAM/ROM) 204, and so on as shown in FIG. 2, each function of the calculation device 1 may be realized by causing the computer to read a calculation program to calculate an initial velocity and a hitting angle of the target moving body having been hit (or shot) from information of a plurality of image frames taken (or shot) from the above with a monocular camera, and by causing the input device 202 and the output device 203 to operate under the control of the central processing unit (CPU) 201 and by causing the main memory (RAM/ROM) 204 and the auxiliary storage device 205 to read and write the data.

As shown in FIG. 1, the calculation device 1 includes a detecting unit 101, a position calculating unit 102, an initial velocity calculating unit 103, and a hitting angle calculating unit 104. The information of the plurality of image frames taken (or shot) from the above with the monocular camera is provided to the calculation device 1 as the input from the outside. The information of the image frames include information for calculating a sequential order of the taken image frames and a time interval of the respective image frames having been taken. Concretely, the number of each image frame indicating the sequential order of taking (or capturing) the image frames and the time when each image frame was taken (or captured) and so on are included. And the calculation device 1 outputs information about the initial velocity and the hitting angle of the target moving body to the outside.

With reference to the block diagram of FIG. 1, the function of each block of the calculation device 1 is explained. Here, a detailed operation of each block will be described later.

The detecting unit 101 detects the target moving body from the information of the plurality of image frames taken from the above with the monocular camera input from the outside.

The position calculating unit 102 calculates a three-dimensional position of the target moving body detected by the detecting unit 101. A concrete calculating process will be described later.

The initial velocity calculating unit 103 calculates the initial velocity of the target moving body from the three-dimensional position of the target moving body calculated by the position calculating unit 102 and the information of the image frames.

The hitting angle calculating unit 104 calculates the hitting angle of the target moving body from the three-dimensional position of the target moving body calculated by the position calculating unit 102 and the information of the image frames.

Next, the coordinate system and so on to be used in the explanation of the present embodiment will be explained.

Figure 3:
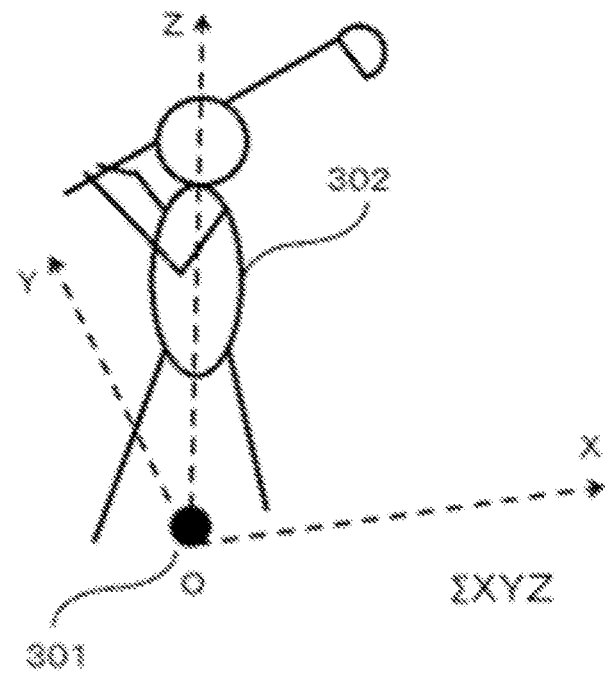
FIG. 3 shows a diagram indicating a three-dimensional orthogonal coordinate system ΣXYZ in a real three-dimensional space.

FIG. 3 shows a diagram illustrating the coordinate system $\Sigma XYZ$, which is a three-dimensional orthogonal coordinate system in the real three-dimensional space to be used in the explanation of the present embodiment. A golf ball 301 placed on the ground surface and a golfer 302 who hits the golf ball 301 are shown. The coordinate system $\Sigma XYZ$ takes a contact point of the golf ball 301 and the ground surface as the origin O as shown in FIG. 3. The Z-axis having the positive direction up from the origin O, the X-axis having the positive direction in which the golf ball 301 is ejected, and the Y-axis having the positive direction from the front of the golfer 302 to the back side are set such that the three axes intersect orthogonally. The X-Y plane corresponds to the ground surface. Here, in the present embodiment, in consideration of easiness of understanding the explanation, the coordinate system $\Sigma XYZ$ is set as described above and explanation thereof continues, but another setting for the coordinate system $\Sigma XYZ$ may be defined as long as the three dimensional position of the target moving body (golf ball) can be specified in the three-dimensional space. For example, the coordinate system $\Sigma XYZ$ can be set by taking the origin O at the center of the golf ball 301. And in the case where the golf ball 301 is teed up, the origin O may be taken at the contact point of the tee just below the golf ball 301 and the ground surface, the origin O may be taken at the contact point of the golf ball 301 and the tee, or the origin O may be taken at the center of golf ball 301. Further, the coordinate system ΣXYZ may be set such that the origin O may be taken at a known fixed position which is not related to the golf ball 301.

Figure 4:
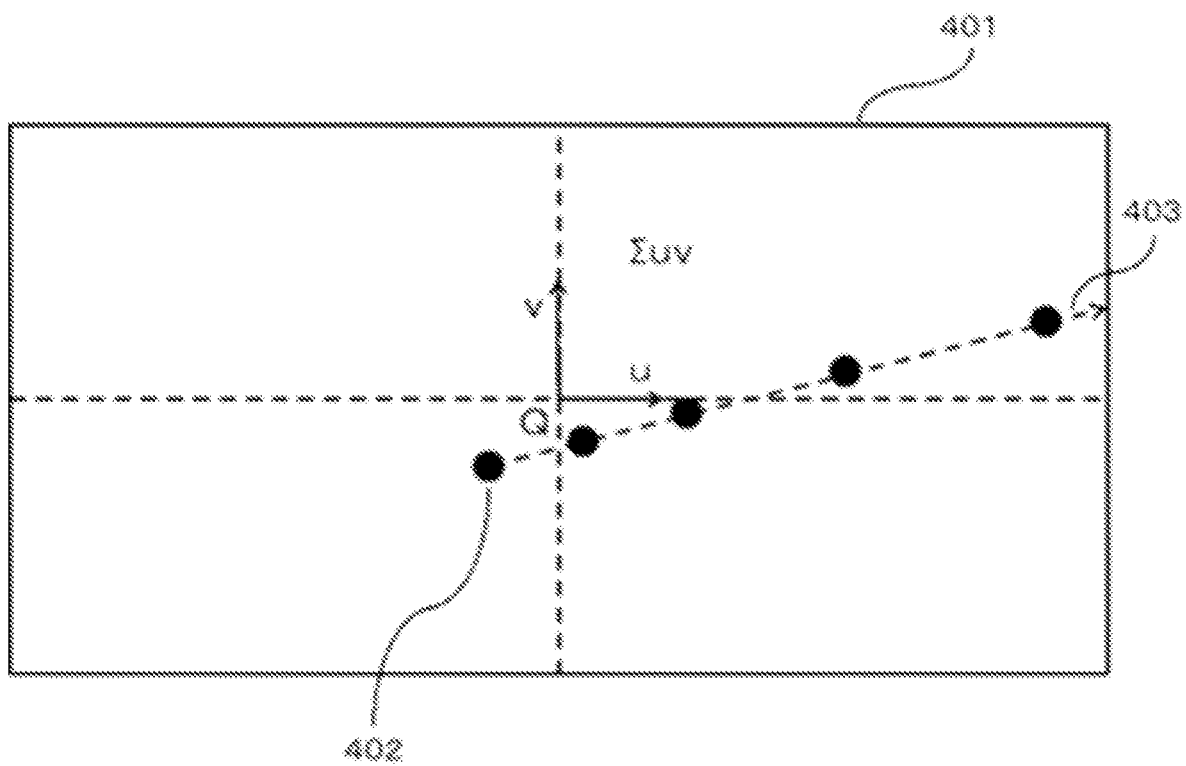
FIG. 4 shows a diagram indicating a state that consecutive plural image frames taken with a constant time interval are superimposed wherein the target moving body having been hit was taken from above with a monocular camera in the respective image frames.

FIG. 4 shows a diagram indicating a state that consecutive plural image frames taken (or shot) with a constant time interval are superimposed wherein the target moving body having been hit was taken (or shot) from the above with a monocular camera in the respective image frames. The coordinate system Σuv is a two-dimensional orthogonal coordinate system set in an image frame 401. Here, the image frame 401 is configured by superimposing the plurality of image frames having been taken as described above. The origin Q of the coordinate system Σuv is an intersection of an optical axis of a lens of the monocular camera and the image frame 401. The optical axis of the lens of the monocular camera is orthogonal to the image frame 401. An image of the target moving body (golf ball) is indicated by 402 at the time of zero (0). The image frame 401 is configured of the plurality of image frames in which respective pictures of the target moving body (golf ball) were taken (or shot) from the above with the monocular camera having a fixed position. Here, taking the pictures from the above means taking images of the target from up above the target. Ideally, it is desirable to arrange the monocular camera above the target moving body (golf ball) such that the optical axis of the lens of the monocular camera and the Z-axis as shown in FIG. 3 are aligned (or match) with each other, but it is to take a picture from the above as long as the picture is taken from up above the target although the Z-axis as shown in FIG. 3 does not match the optical axis of the lens of the monocular camera. That is, in the ideal case where the Z-axis as shown in FIG. 3 and the optical axis of the lens of the monocular camera match with each other, the position of the image 402 of the target moving body (golf ball) at the time of zero (0) is at the origin Q while in the coordinate system Σuv, as shown in FIG. 4, it is not prevented that the position of the target moving body (golf ball) at the time of zero (0) does not coincide with the origin Q in the coordinate system Σuv.

A direction in which images of the target moving body (golf ball) having been shot travel on the image frame 401 is indicated by a dashed-line arrow 403. Black dots appearing on the dashed-line arrow 403 are superimposed images of the target moving body (golf ball) taken in the plurality of consecutive image frames having been taken with a constant time interval. Since the plurality of image frames are consecutive, the respective time intervals with which the neighboring images of the target moving body (golf ball) were taken are the same. That is, the frame rate is constant (1/T). As shown in FIG. 4, respective distances of mutually-neighboring images of the target moving body (golf ball) taken in the plurality of consecutive image frames with the constant time interval are shown in the image frame 401 configured by superimposing the image frames such that the respective distances in two dimensions on the image frame 401 are getting longer with lapse of the time.

Figure 5:
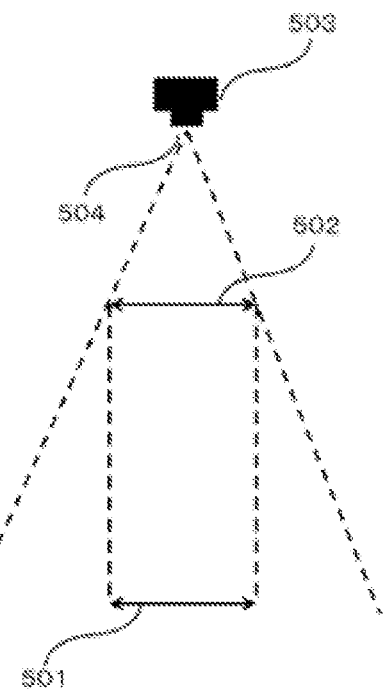
FIG. 5 shows a diagram illustrating that distances between neighboring images of the target moving body captured in consecutive plural image frames taken with a constant time interval in two dimensions become longer with time.

FIG. 5 shows a diagram illustrating that respective distances between mutually-neighboring images of the target moving body (golf ball) in the plurality of consecutive image frames taken (or captured) with the constant time interval are getting longer over time in two dimensions on the image frame 401 that is configured by superimposing the image frames. Suppose that the target moving body (golf ball) having been shot makes a parabolic motion (or projectile motion), since it is considered to make a uniform motion (or constant velocity linear motion) in the horizontal direction (parallel direction to the X-Y plane in the coordinate system ΣXYZ) immediately after the shot, the moving distance in the horizontal direction should be the same if they are taken with the same time interval. On the other hand, in the case where the target moving body (golf ball) having been shot is taken from above with the monocular camera, the target moving body (golf ball) moves in a direction toward the lens of the monocular camera taking pictures of the target moving body (golf ball) as in the vertical direction. Even if the moving distance in the horizontal direction is constant, the moving distance on the image frame 401 should be longer if it is closer to the lens because of the angle of view and the moving distance on the image frame 401 should be shorter if it is farther from the lens. The length of the arrow 501 and the length of the arrow 502 are the same in FIG. 5, but, if images are taken by the monocular camera 503, with respect to the distance in two dimensions on the image frame 401, the arrow 502 appears longer than the arrow 501. This is because the distance from the optical center 504 of the lens of the monocular camera 503 becomes shorter to the arrow 502 than to the arrow 501.

Figure 6:
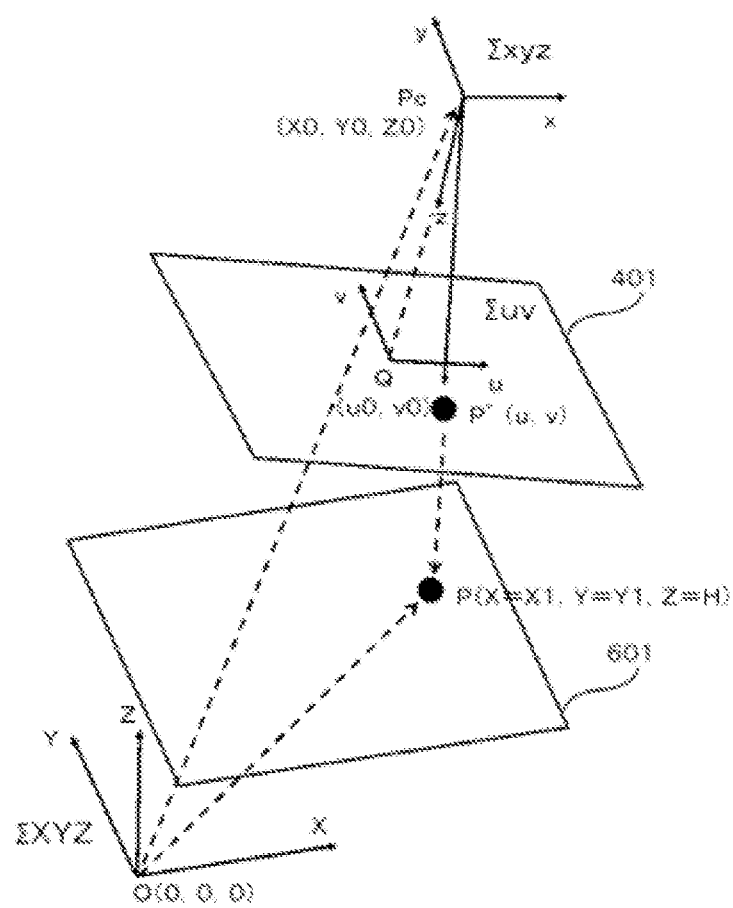
FIG. 6 shows a diagram illustrating mutual relationships of respective coordinate systems.

FIG. 6 shows a diagram illustrating mutual relationships of respective coordinate systems to be used in the present embodiments. The coordinate system ΣXYZ is a three-dimensional orthogonal coordinate system in the real three-dimensional space as explained with reference to FIG. 3. The three-dimensional coordinates of the origin O may be set as O(0, 0, 0). The coordinate system Σuv is a two-dimensional orthogonal coordinate system set in the image frame 401 as explained with reference to FIG. 4. The two-dimensional coordinates of the origin Q may be set as Q(u0, v0). The coordinate system Σxyz is a three-dimensional orthogonal coordinate system having the origin Pc at the optical center of the lens of the monocular camera. The three-dimensional coordinates of the origin Pc in the coordinate system ΣXYZ may be set as Pc(X0, Y0, Z0). In the present embodiment, it will be explained by assuming the position (coordinates of the origin Pc in the coordinate system ΣXYZ) of the optical center of the lens of the monocular camera in the real three-dimensional space is known. The position of the monocular camera may be fixed and the coordinates of the optical center of the lens in the real three-dimensional apace may be given in advance, or the coordinates of the optical center of the lens in the real three-dimensional apace may be calculated and determined from the external parameters of the monocular camera and the taken (or shot) image information. The coordinate system Σuv is a coordinate system that is configured by moving the coordinate system Σxyz in parallel such that the x-axis and the u-axis are parallel and the y-axis and the v-axis are parallel, respectively. And the intersection of the z-axis of the coordinate system Σxyz and the image frame 401 is set as the origin Q of the coordinate system Σuv. The x-axis of the coordinate system Σxyz corresponds to the optical axis of the lens of the monocular camera. The z-axis of the coordinate system is orthogonal to the image frame 401. A dot designated by P' represents an image of the target moving body (golf ball) P. Details about P and P' will be described later. Details about the plane 601 as shown in FIG. 6 will be described with reference to Embodiment 2 later.

Figure 7:
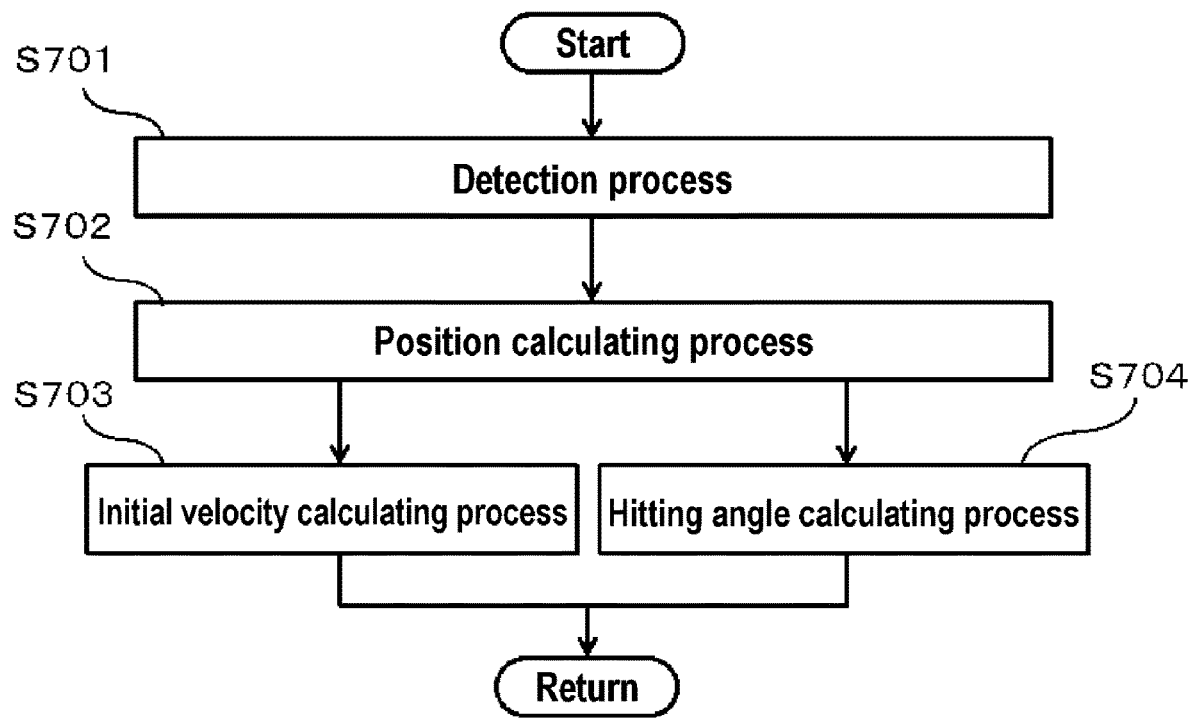
FIG. 7 shows a flow chart illustrating operations of the calculation device.

Next, an operation of the calculation device 1 of the present embodiment is explained. FIG. 7 shows a flow chart showing the operation of the calculation device 1 of the present embodiment. With reference to the flow chart of FIG. 7, the operation of the calculation device 1 is explained.

Information of the plurality of image frames taken from above with the monocular camera, which is an object to be processed, is input into the calculation device 1 from the outside. The calculation device 1 starts to work after the information as the object to be processed is input. It may start to work automatically after inputting the information or upon an explicit instruction. The calculation device 1 reads out the information for each image frame having been input and conducts processes of the flow chart as shown in FIG. 7.

The information of the image frames includes image information of the target moving body (golf ball) having been shot and also necessary information for calculating an initial velocity thereof. For example, it includes time when each of the image frames was taken, their frame numbers, a frame rate, and so on. Examples exemplified herein as the information may be necessary information and, as long as the initial velocity can be calculated, any type of information may be useful. In the present embodiment, explanation will be made assuming that the plurality of image frames as an object to be processed are those having been taken consecutively, the frame rate is constant (1/T), and the information includes consecutive frame numbers in the order in which the respective image frames were taken.

Once the calculation device 1 starts to work, a detecting unit 101 executes a detecting process (S701). In the detecting process (S701), the target moving body (golf ball) is detected from the information of the image frames having been input.

With respect to the detection of the target moving body (golf ball) from the information of the image frames, any method or process may be acceptable as long as two-dimensional coordinates of the target moving body (golf ball) can be determined in the image frame. For example, a method of detecting an image such as template matching may be employed. As mentioned above, with respect to the golf, if the image is taken from above, the background tends to be uniform such as a ground surface (lawn in many cases) such that it is easy to detect such a small white golf ball by a simple method such as template matching.

The detecting unit 101 detects the target moving body (golf ball) from the information of each image frame having been input and the two-dimensional coordinates in the image frame are determined, then the detecting process (S701) ends. When the detecting process (S701) is terminated, the position calculating unit 102 starts a position calculating process (S702).

Figure 8:
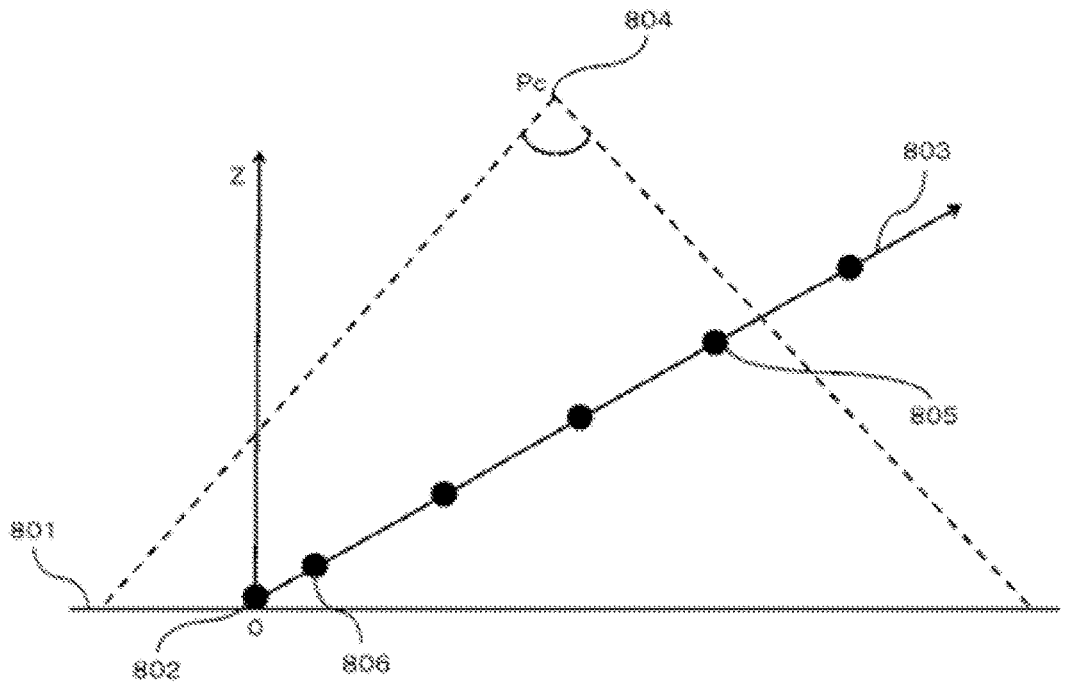
FIG. 8 shows a schematic diagram illustrating simplified overview of a position calculating process.

FIG. 8 shows a schematic diagram simplified for the purpose of explaining a general description of the position calculating process (S702). FIG. 8 shows a situation that the monocular camera arranged at an upper part takes pictures of the target moving body (golf ball) 802 that is placed on and in contact with the ground surface 801 and is shot. The contact point of the ground surface 801 and the target moving body (golf ball) 802 placed in contact with the ground surface 801 corresponds to the origin O of the coordinate system ΣXYZ that is the three-dimensional orthogonal coordinate system in the real three-dimensional space. The ground surface 801 corresponds to the XY plane and the Z-axis extends upwards in a vertical direction to the ground surface 801.

FIG. 8 shows schematically what a trajectory 803 is like in a trajectory plane, in which the target moving body (golf ball) 802 placed in contact with the ground surface 801 is shot. In the present embodiment, the trajectory plane refers to a plane on which a position of the optical center of the lens of the monocular camera exists and the trajectory of the shot target moving body (golf ball) exists. In the present embodiment, the center of the target moving body (golf ball) 802 placed in contact with the ground surface 801 is described as a reference point. Suppose that a value of the radius of the golf ball is r, the coordinates of the reference point in the coordinate system ΣXYZ are (0, 0, r).

Since the information to be used for the position calculating process is information of the image frames having been taken (or captured) for a short period of time immediately after the shot, a motion of the target moving body (golf ball) is calculated in the position calculating process (S702) by approximating the motion as a uniform linear motion. Thus, the trajectory 803 as shown in FIG. 8 would be linear (or a straight line). The position 804 is the position PC of the optical center of the lens of the monocular camera. Two dashed lines drawn from the position Pc indicate an imaging (capturing) range by the monocular camera. The angle formed by the two dashed lines is an angle of view of the lens of the monocular camera. Black circles (points) shown on the trajectory 803 indicate positions of the target moving body (golf ball) at respective times when its images were taken (or captured). In image frames taken with the monocular camera fixed at the position 804, points of from the target moving body (golf ball) 802 placed on and in contact with the ground surface 801 to the target moving body (golf ball) 805 having moved along the trajectory 803 after being shot may be taken (or captured).

In explanation of the present embodiment, among points corresponding to the target moving body (golf ball) having been taken (or captured) consecutively in the image frames with the monocular camera, except the point of the target moving body (golf ball) 802 placed in contact with the ground surface 801, the point taken at the earliest time is described as a starting point and the point taken at the latest time is described as an ending point. In FIG. 8, the point indicated by 806 (position of the center of the golf ball) is referred to as the starting point and the point indicated by 805 (position of the center of the golf ball) is referred to as the ending point. And consecutive numerical numbers (n) are assigned to the respective points corresponding to the target moving body (golf ball) as one (1) is assigned to the starting point. Suppose that the number n of the ending point is N. In the case of FIG. 8, N=4. As mentioned above, in the present embodiment, since the motion of the target moving body (golf ball) is approximated as the uniform linear motion, distances between mutually-neighboring points taken (or captured) consecutively and corresponding to the target moving body (golf ball) are the same from the starting point to the ending point. This is because the image frames are those taken (or captured) consecutively and the frame rate is constant (1/T). On the other hand, the distance between the position 806 of the starting point and the position of the target moving body (golf ball) 802 placed in contact with the ground surface 801 is shorter than other distances between mutually-neighboring points taken (or captured) consecutively and corresponding to the target moving body (golf ball). This is because the time when the target moving body (golf ball) 802 placed in contact with the ground surface 801 was taken (or captured) and the time when it was shot (ejected) are not the same, but the time of being shot is later than the time of being taken.

In the position calculating process (S702) of the present embodiment, with respect to the target moving body (golf ball), three-dimensional positions in the real three-dimensional space of the respective points from the starting point to the ending point are calculated from two-dimensional coordinates of the respective points in the image frames determined by the detecting process (S701). In the following, the position calculating process (S702) will be explained by taking an example where the three-dimensional position of the ending point 805 in the real three-dimensional space in FIG. 8 is calculated.

FIGS. 9 to 13 show diagrams explaining the position calculating process (S702) by taking an example where the three-dimensional position of the ending point 805 in the real three-dimensional space is calculated. By explaining FIGS. 9 to 13, the position calculating process (S702) is explained in the case where the three-dimensional position of the ending point 805 in the real three-dimensional space in FIG. 8 is calculated.

Figure 9:
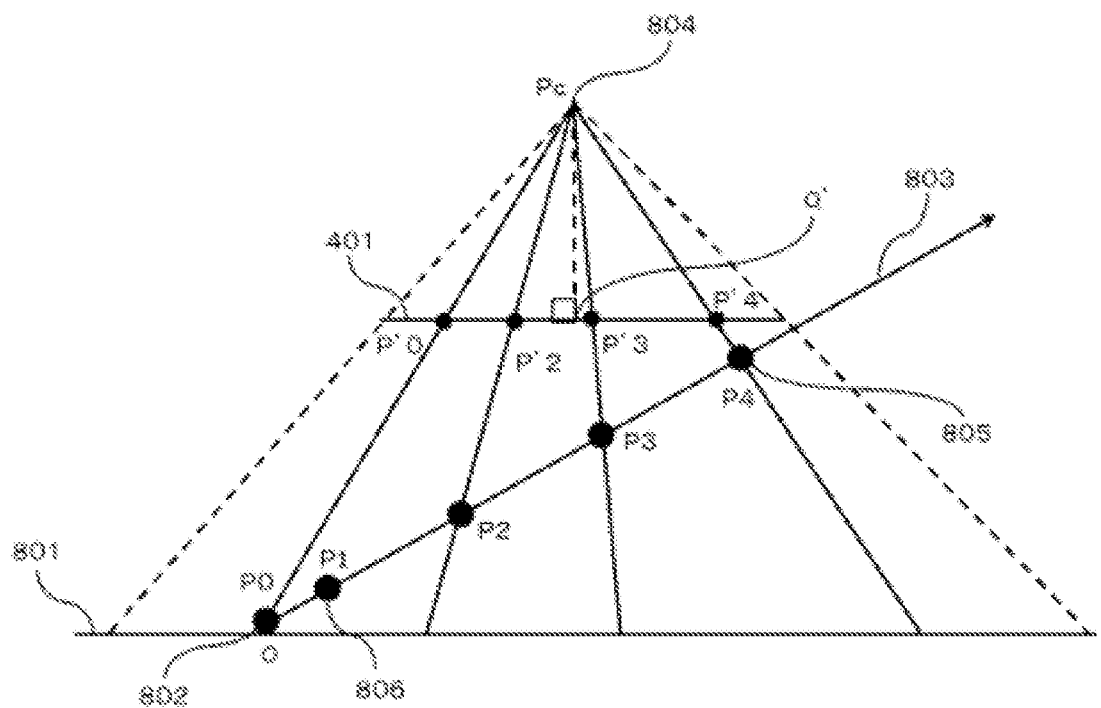
FIG. 9 shows a diagram illustrating a position calculating process.

FIG. 9 shows a diagram, which is configured by adding components to FIG. 8, to explain the position calculating process (S702) by taking an example where the three-dimensional position of the ending point 805 in the real three-dimensional space is calculated. FIG. 9 shows a situation where the target moving body (golf ball) 802 placed in contact with the ground surface 801 was shot out in the trajectory plane of the trajectory 803 in a similar manner as shown in FIG. 8. The points from P0 to P4 along the trajectory 803 indicate the target moving body (golf ball) at the respective times when it was taken consecutively. The point P0 is the reference point 802, the point P1 is the starting point, and the point P4 is the ending point 805. The numerical reference 401 indicates the image frame and the point P'0 indicates an image of the point P0, the point P'2 indicates an image of the point P2, the point P'3 indicates an image of the point P3, and the point P'4 indicates an image of the point P4 in the image frame 401. The line passing through the points from P'0 to P'4 corresponds to an image of the trajectory 803 on the image frame 401. The reference Q' refers to a foot of a perpendicular line drawn from the position Pc of the optical center of the lens of the monocular camera to an image of the trajectory 803 on the image frame 401.

Figure 10:
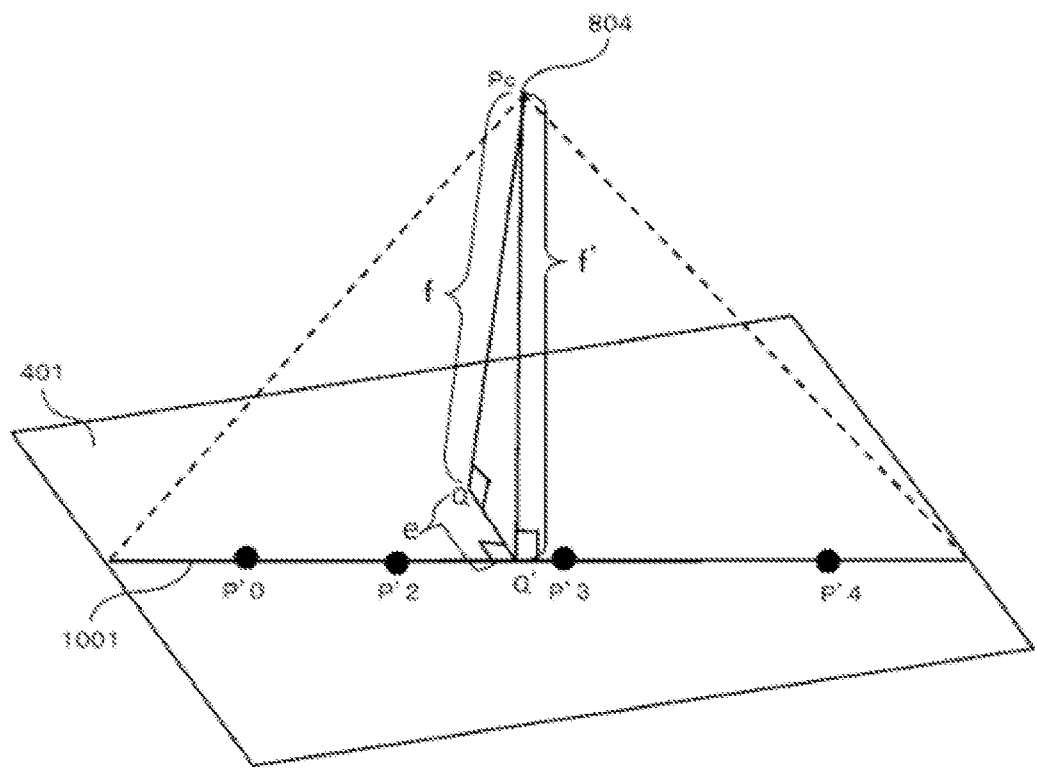
FIG. 10 shows a diagram illustrating a position calculating process.

FIG. 10 shows a diagram illustrating the image frame 401 of FIG. 9. A straight line 1001 is the image of the trajectory 803 on the image frame 401 and the respective points from P'0 to P'4 are on the straight line 1001. As mentioned in the explanation of FIG. 9, the reference Q' is the foot of the perpendicular line drawn from the position Pc of the optical center of the lens of the monocular camera to the image 1001 of the trajectory 803 on the image frame 401. Here, the distance between the position Q' and the position Pc of the optical center of the lens of the monocular camera is designated by f'. Then, the reference Q is referred to as the origin of the two-dimensional coordinate system Σuv on the image frame 401 as described in the explanation of FIG. 6 and is a foot of a perpendicular line drawn from the position Pc of the optical center of the monocular camera to the image frame 401. And the distance f between the position Q and the position Pc of the optical center of the lens of the monocular camera is a focal length of the lens of the monocular camera. Further, the straight line connecting the position Q and the position Q' is orthogonal to the straight line 1001.

In FIG. 10, the reference e indicates the distance between the position Q and the position Q'. The coordinates of the respective points from P'0 to P'4, which correspond to images of the target moving body (golf ball) on the image frame 401, in the two-dimensional coordinate system Σuv can be obtained from the image frame information such that the straight line 1001 can be obtained on the image frame 401 from such information. The reference Q' indicates a food of a perpendicular line drawn from the origin Q of the two-dimensional coordinate system Σuv to the straight line 1001 and the h can be obtained since the coordinates of the position Q' can be obtained geometrically in the two-dimensional coordinate system Σuv. The focal length f is a specific value of the lens of the monocular camera such that, assuming the focal length is known, the following formula (Formula 1) may be satisfied.

$$(f')^2 = e^2 + f^2$$  (Formula 1).

The f' can be obtained from the formula (Formula 1).

Figure 11:
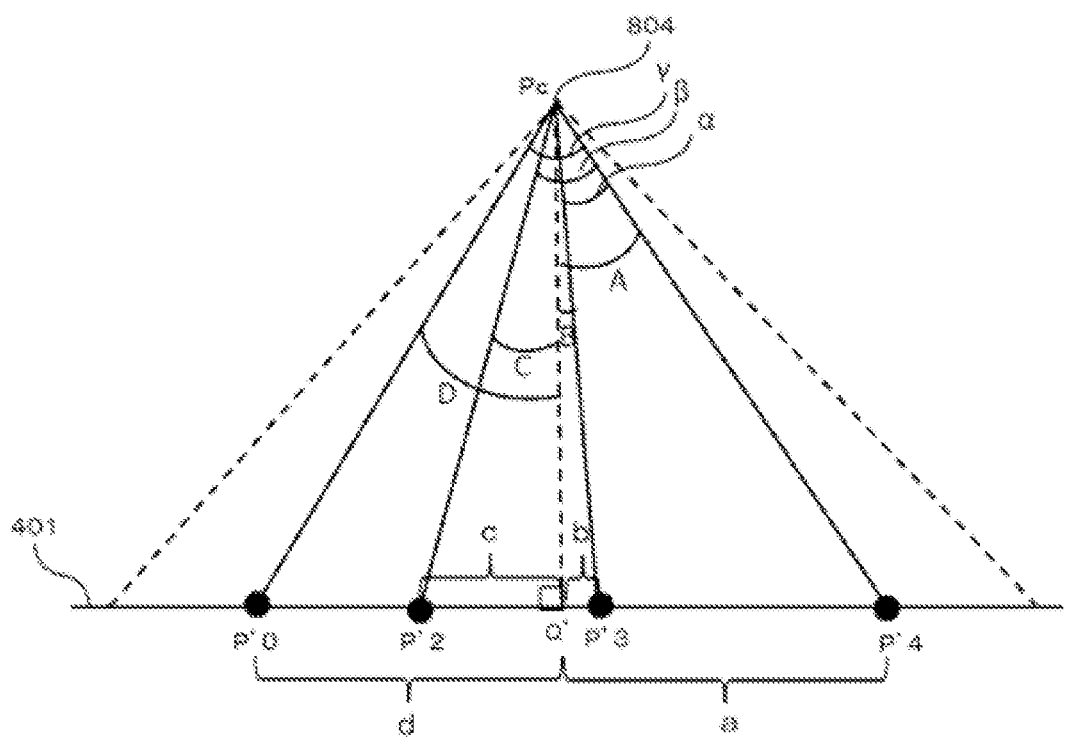
FIG. 11 shows a diagram illustrating a position calculating process.

FIG. 11 shows a diagram in which portions with respect to the images of the target moving body (golf ball) on the image frame 401 are extracted from FIG. 9 and reference symbols and so on are added thereto. An angle formed by the straight line connecting the point Pc and the point P'4 and the straight line connecting the point Pc and the point P'3 is referred to as α, an angle formed by the straight line connecting the point Pc and the point P'4 and the straight line connecting the point Pc and the point P'2 is referred to as β, and an angle formed by the straight line connecting the point Pc and the point P'4 and the straight line connecting the point Pc and the point P'0 is referred to as γ. An angle formed by the straight line connecting the point Pc and the point Q' and the straight line connecting the point Pc and the point P'4 is referred to as A, an angle formed by the straight line connecting the point Pc and the point Q' and the straight line connecting the point Pc and the point P'3 is referred to as B, an angle formed by the straight line connecting the point Pc and the point Q' and the straight line connecting the point Pc and the point P'2 is referred to as C, and an angle formed by the straight line connecting the point Pc and the point Q' and the straight line connecting the point Pc and the point P'0 is referred to as D. A distance between the point Q' and the point P'4 is referred to as a, a distance between the point Q' and the point P'3 is referred to as b, a distance between the point Q' and the point P'2 is referred to as c, and a distance between the point Q' and the point P'0 is referred to as d. Here, the coordinates of the respective points from P'0 to P'4, which correspond to images of the target moving body (golf ball) on the image frame 401, in the two-dimensional coordinate system Σuv can be obtained from the image frame information such that a, b, c, and d can be calculated from the thus-obtained coordinates.

Based on FIG. 11, derivation of tan(α) and tan(β) from the a, b, c, and d and f' (distance between the position Q' and the position Pc of the optical center of the lens of the monocular camera) obtained through the above-mentioned Formula 1 is explained. In the following, the derivation of tan(α) and tan(β) may be shown by the formulae.

The following series of formulae may be derived from FIG. 11.

$$A = \arctan(a/f'),$$

$$B = \arctan(b/f'),$$

$$C = \arctan(c/f'), \text{ and}$$

$$D = \arctan(d/f').$$

Further, the following series of formulae may be derived from FIG. 11.

$$\alpha = A - B,$$

$$\beta = A + C, \text{ and}$$

$$\gamma = A + D.$$

As shown below, $\tan(\alpha)$ may be derived from the above-mentioned formulae and the tangential addition formula (theorem).

$$\tan(\alpha)=\tan(A-B),$$

$$\tan(\alpha)=(\tan(A)-\tan(B))/(1+\tan(A)\times\tan(B)),$$

$$\tan(\alpha)=(a/f'-b/f')/(1+(a\times b)/(f')^2), \text{ and}$$

$$\tan(\alpha)=(a-b)/(f'+(a\times b)/f') \quad \text{(Formula 2)}.$$

The derived formulae of $\tan(\alpha)$ are referred to as collectively Formula 2.

In a similar manner, $\tan(\beta)$ may be derived as the following formula (Formula 3).

$$\tan(\beta)=(a+c)/(f'-(a\times c)/f') \quad \text{(Formula 3)}.$$

Figure 12:
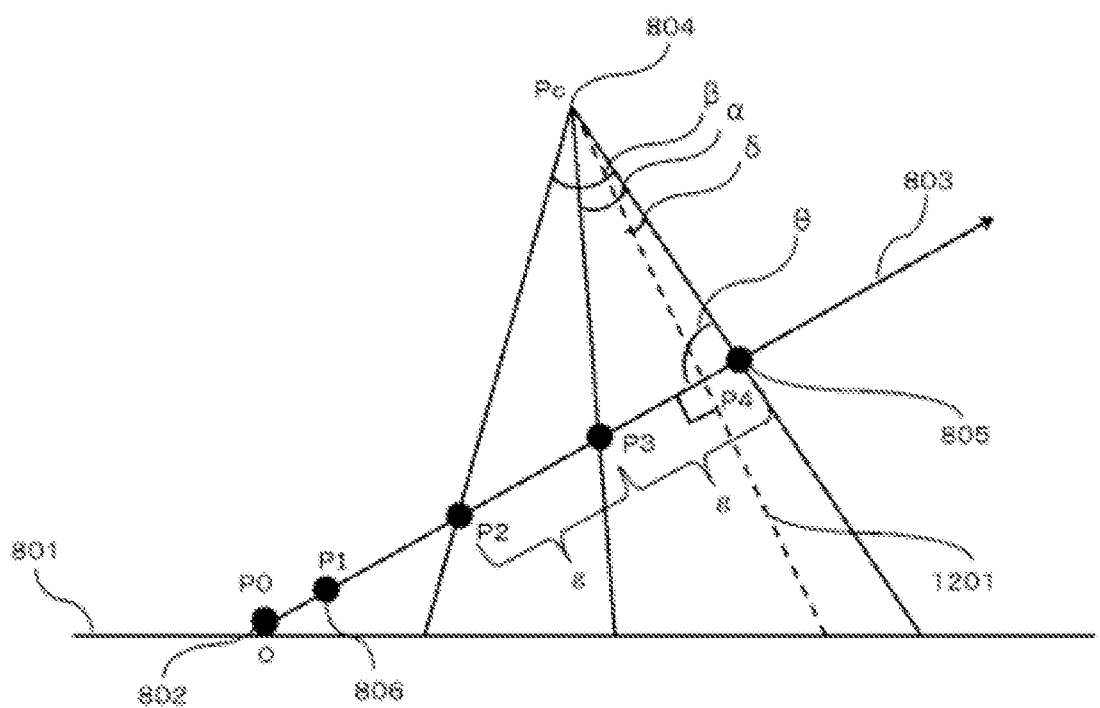
FIG. 12 shows a diagram illustrating a position calculating process.

FIG. 12 shows a diagram in which portions with respect to the target moving body (golf ball) in the real three-dimensional space are extracted from FIG. 9 and reference symbols and so on are added thereto. FIG. 12 shows a straight line 1201 depicted with a dashed line which is a perpendicular line from the point Pc to the trajectory 803 and an angle formed by the straight line 1201 and a straight line connecting the point Pc and the point P4 is referred to as $\delta$. And an angle formed by the trajectory 803 and the straight line connecting the point Pc and the point P4 is referred to as $\theta$. In the present embodiment, it is assumed that the target moving body (golf ball) makes a uniform linear motion such that a distance between the point P2 and the point P3 and a distance between the point P3 and the point P4 are the same and the distance is referred to as g.

Based on FIG. 12, derivation of the angle $\theta$ is explained. The angle $\theta$ is denoted by $\tan(\alpha)$ and $\tan(\beta)$. In the following, the derivation of the angle $\theta$ is shown by formulae.

In FIG. 12, the following formula may be satisfied.

$$2\times(\tan(\delta)+\tan(\alpha-\delta))=\tan(\delta)+\tan(\beta-\delta)=2\times d.$$

After the tangent addition formula (theorem) applies to the formula, it is expanded to cubic formulae and rearranged.

$$\tan(\delta)+2\times(\tan(\alpha)-\tan(\delta))/(1+\tan(\alpha)\times\tan(\delta))-(\tan(\beta)-\tan(\delta))/(1+\tan(\beta)\times\tan(\delta))=0,$$

$$\tan(\alpha)\times\tan(\beta)\times(\tan(\delta))^3+(2\times\tan(\alpha)-\tan(\beta)\times(\tan(\delta))^2+\tan(\alpha)\times\tan(\beta)\times\tan(\delta)+2\times\tan(\alpha)-\tan(\beta)=0, \text{ and}$$

$$(\tan(\alpha)\times\tan(\beta)\times\tan(S)+2\times\tan(\alpha)-\tan(\beta))((\tan(\alpha))^2+1)=0.$$

Here, $(\tan(\alpha))^2+1$ is always positive. Thus, $$\tan(\alpha)\times\tan(\beta)\times\tan(\delta)+2\times\tan(\alpha)-\tan(\beta)=0,$$

$$\tan(\delta)=1/\tan(\alpha)-2/\tan(\beta), \text{ and}$$

$$\delta=\arctan(1/\tan(\alpha)-2/\tan(\beta)).$$

Since the sum of three angles of the triangle is $\pi$, the angle $\theta$ is represented by the following formula (Formula 4). And $\tan(\alpha)$ and $\tan(\beta)$ may be obtained by the above-mentioned Formula 2 and Formula 3.

$$\theta=\pi/2-\delta=\pi/2-\arctan(1/\tan(\alpha)-2/\tan(\beta)) \quad \text{(Formula 4)}.$$

Figure 13:
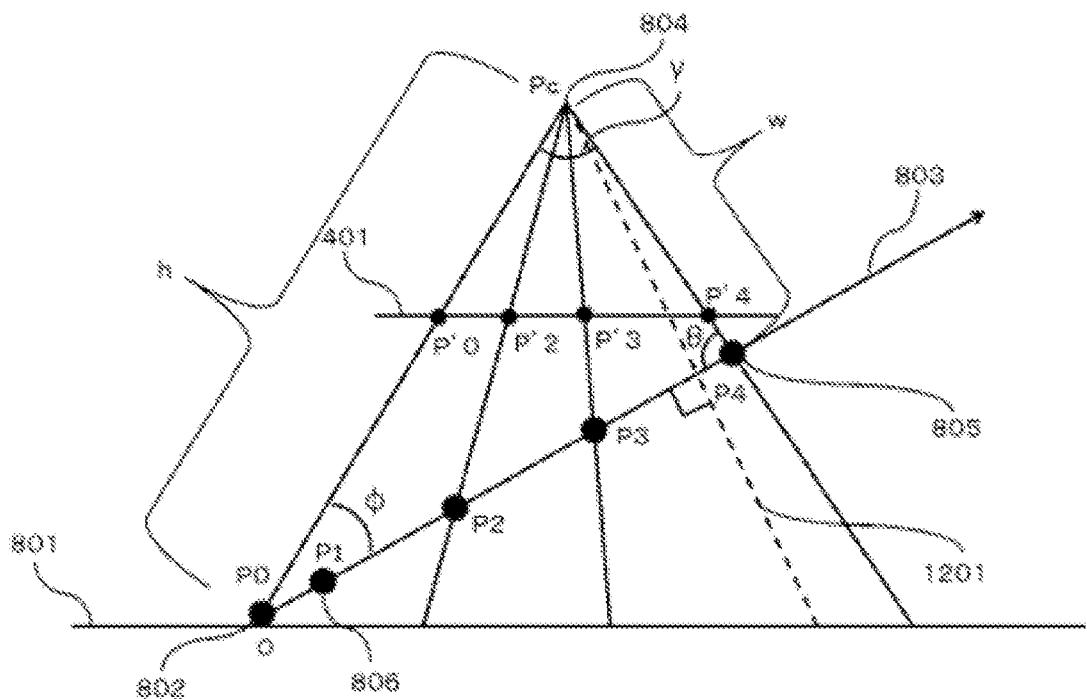
FIG. 13 shows a diagram illustrating a position calculating process.

FIG. 13 shows a diagram in which portions are extracted from FIG. 9 in order to explain how the three-dimensional position of the ending point 805 is calculated in the real three-dimensional space and reference symbols and so on are added thereto. In FIG. 13, an angle formed by the trajectory 803 and a straight line connecting the point Pc and the point P0 is referred to as $\varphi$. And a distance between the point Pc and the point P0 is referred to as h and a distance between the point Pc and the point P4 is referred to as w.

In FIG. 13, the following formulae (collectively Formula 5) are satisfied.

$$w\times\sin(\theta)=h\times\sin(\varphi), \text{ and}$$

$$w=h\times\sin(\varphi)/\sin(\theta) \quad \text{(Formula 5)}.$$

Here, since the three-dimensional positions of the optical center Pc of the lens of the monocular camera and the target moving body (golf ball) placed in contact with the ground surface 801 in the real three-dimensional space are known, the distance h between the position Pc and the position P0 can be calculated. If $\sin(\varphi)$ and $\sin(\theta)$ are obtained, the distance w between the position Pc and the position P4 can be calculated by Formula 5. Since $\theta$ is calculated by the above-mentioned Formula 4, $\sin(\theta)$ is obtained.

The following formula is satisfied with respect to $\varphi$.

$$\varphi=\pi-\gamma-\theta.$$

By the above-mentioned Formula 4, $\theta$ is calculated. As explained with reference to FIG. 11, $\gamma$ is calculated by the following formula.

$$\gamma=A+D=\arctan(a/f')+\arctan(d/f').$$

AS the distance w between the point Pc and the point P4 is obtained by Formula 5, the three-dimensional position of the point P4 (ending point 805) in the real three-dimensional space can be represented by the following vector formula (equation).

$$P4=Pc+w\times(P'4-Pc)/|P'4-Pc| \quad \text{(Formula 6)}.$$

In the present embodiment, the position calculating unit 102 calculates the three-dimensional position of the target moving body (golf ball) by conducting the process above-explained with reference to FIGS. 8 to 13 as the position calculating process (S702). Here, the process disclosed herein is just an example and it cannot be limited thereto. As long as the three-dimensional position of the target moving body detected in the detecting process can be calculated, no matter what process may be used.

Returning to FIG. 7, when the position calculating process (S702) is terminated, the initial velocity calculating unit 103 conducts the initial velocity calculating process (S703) and the hitting angle calculating unit 104 conducts the hitting angle calculating process (S704), respectively. In the initial velocity calculating process (S703), a mean value of distances between mutually-neighboring images of the target moving body (golf ball) calculated from the three-dimensional coordinates of the target moving body (golf ball) calculated in the position calculating process (S702) is obtained and the mean value is multiplied by the frame rate (1/T) so as to obtain the value as the initial velocity. In the hitting angle calculating process (S704), a straight line connecting the starting point and the ending point is calculated from three-dimensional coordinates of the target moving body (golf ball) calculated in the position calculating process (S702) and an angle formed by the thus-calculated straight line and the ground surface (the XY plane in the coordinate system $\Sigma XYZ$) is calculated as the hitting angle.

The calculation device 1 outputs the initial velocity calculated by the initial velocity calculating unit 103 in the initial velocity calculating process (S703) and the hitting angle calculated by the hitting angle calculating unit 104 in the hitting angle calculating process (S704).

Figure 14:
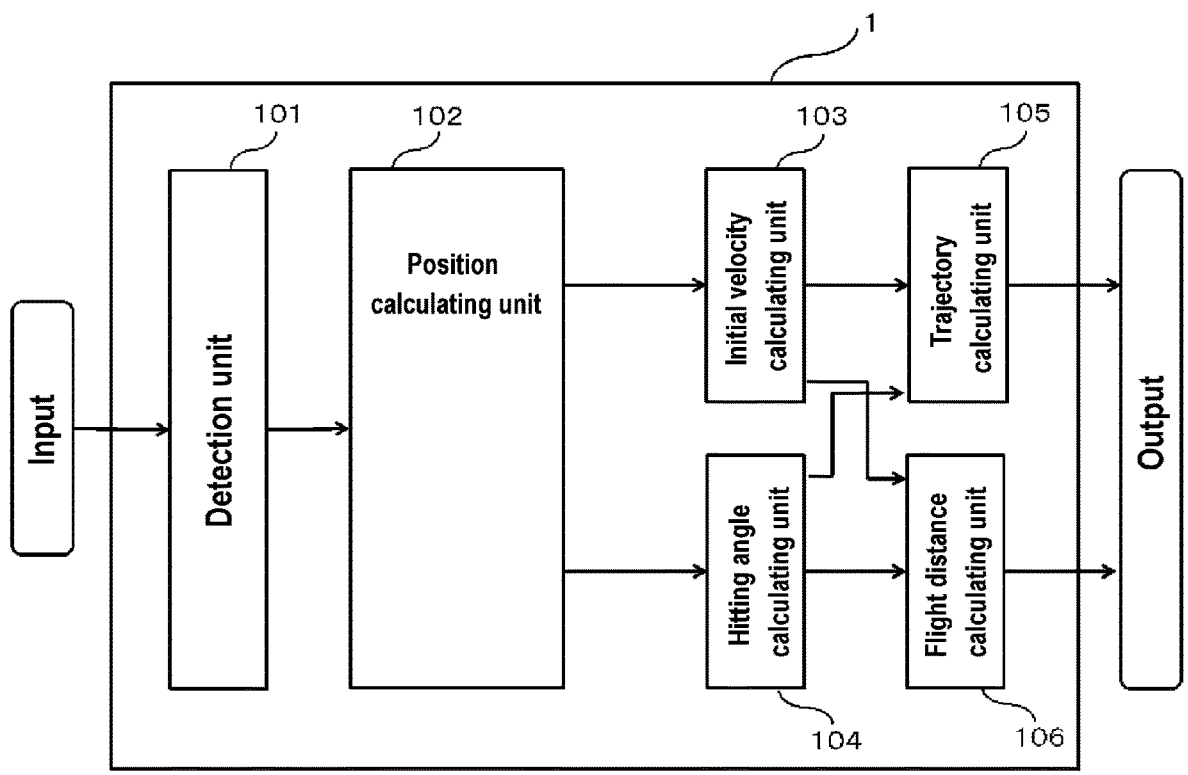
FIG. 14 shows a block diagram of the calculation device.

The calculation device 1 may include a trajectory calculating unit 105 and a flight distance calculating unit 106 as shown in FIG. 14. The trajectory calculating unit 105 calculates a trajectory of the target moving body in three dimensions from the initial velocity of the target moving body calculated by the initial velocity calculating unit 103 and the hitting angle of the target moving body calculated by the hitting angle calculating unit 104. The trajectory of the target moving body is calculated assuming that it makes a parabolic motion in accordance with the law of nature. And the flight distance calculating unit 106 calculates the flight distance of the target moving body from the initial velocity of the target moving body calculated by the initial velocity calculating unit 103 and the hitting angle of the target moving body calculated by the hitting angle calculating unit 104. The flight distance is calculated by obtaining a landing point that is an intersection of the trajectory calculated by the trajectory calculating unit 105 and the ground surface (XY plane in the coordinate system ΣXYZ).

The aforementioned description is explanation about the calculation device.

Next, a calculation system will be explained. The calculation system includes a monocular camera arranged at a position where it can take (or capture) an image of the target moving body from above and the above-mentioned calculation device. The monocular camera and the calculation device may be mutually separate or may be configured to become one system as a whole. In the system where the monocular camera and the calculation device are mutually separate, the monocular camera and the calculation device may be connected to the wired or wireless communication network such that taken (or captured) image data may be successively transferred or be one-time accumulated and then the accumulated data may be transferred, or the taken (or captured) image data may be stored in a storage medium or the like and thus-stored data may be transferred to the calculation device. And in the system where the monocular camera and the calculation device are integrally unified, for example, a system may be configured to be a unified system of the monocular camera and the calculation device by making an information equipment such as a smartphone with a built-in monocular camera work as the calculation device since a later-described calculation program is provided thereto as an application or else.

Next, the calculation program will be explained in order to make the computer work as the calculation device. The configuration of the computer is as shown in FIG. 2.

The calculation program includes a main module, an input-output module, and an arithmetic processing module. The main module is a part that controls overall processes. The input-output module makes the computer obtain input information such as image data and makes the computer output calculated information as a numerical value and an image. The arithmetic processing module includes a detecting module, a position calculating module, an initial velocity calculating module, a hitting angle calculating module, an existence straight line calculating module, an existence surface calculating module, a trajectory calculating module, and a flight distance calculating module. The functions realized by executing the main module, the input-output module, and the arithmetic processing module are the same or similar as those of the detecting unit 101, the position calculating unit 102, the initial velocity calculating unit 103, the hitting angle calculating unit 104, the trajectory calculating unit 105, and the flight distance calculating unit 106 of the calculation unit 1, respectively.

The calculation program is provided by a storage medium or semiconductor memory such as ROM. The calculation program may be provided through the network.

The aforementioned descriptions are explanation of Embodiment 1.

Embodiment 2

In a calculation device, a calculation method, a calculation program, and a calculation system disclosed as Embodiment 2 of the present invention, there is disclosed an example that an existence straight line connecting the three-dimensional position of the optical center of the lens of the monocular camera and a three-dimensional position of an image of the target moving body taken (or captured) in the image frame is calculated from the information of the image frames taken (or captured) from above with the monocular camera using the three-dimensional position of the target moving body; an existence surface is calculated on which the target moving body may exist with some probability; and a three-dimensional position of an intersection of the existence straight line and the existence surface is calculated as the three-dimensional position of the target moving body. In addition, in Embodiment 2, with respect to the calculation of the three-dimensional position of the target moving body, it is disclosed, by way of example, that a candidate three-dimensional position having the highest probability of existence of the target moving body is calculated as the three-dimensional position of the target moving body by a search algorithm from among a plurality of candidate three-dimensional positions having some probability of existence of the target moving body.

Figure 15:
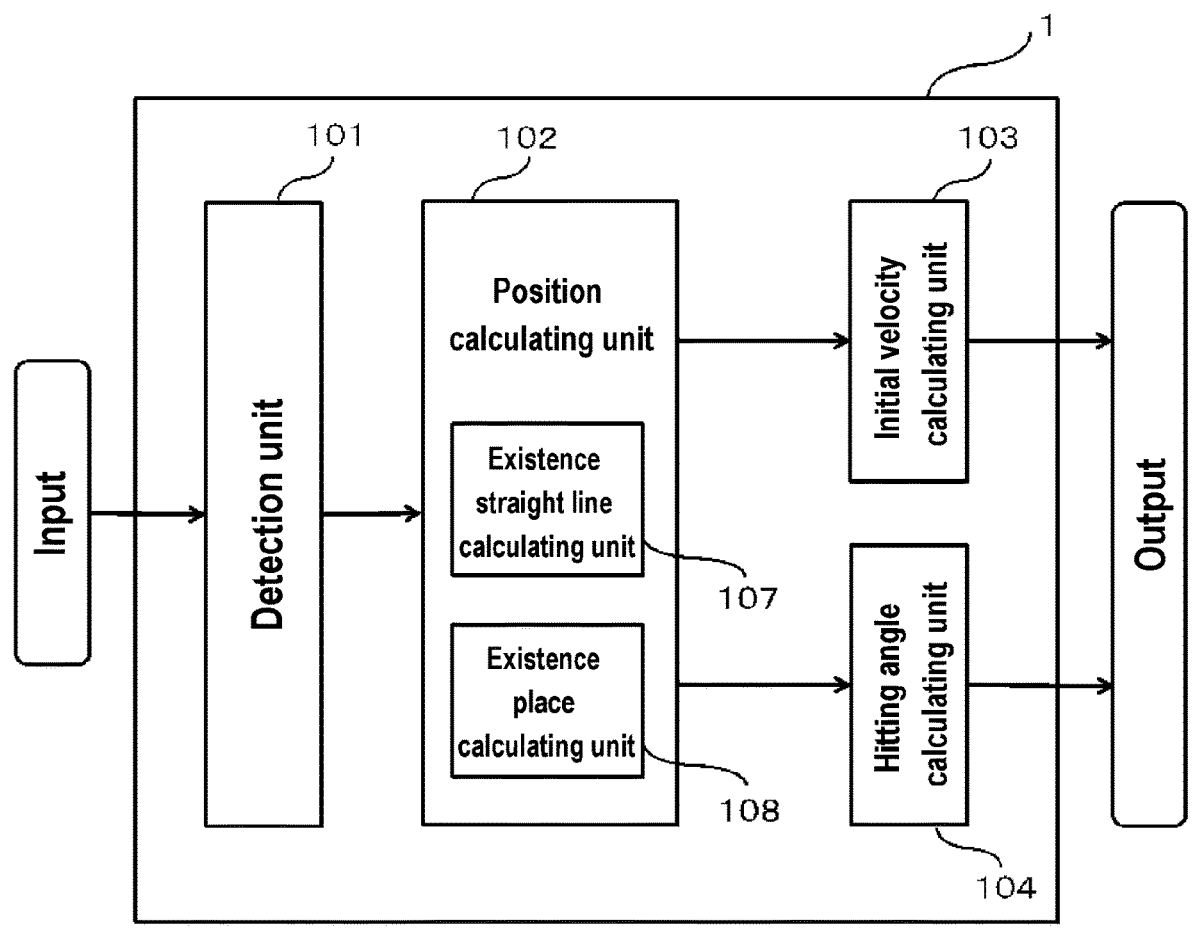
FIG. 15 shows a block diagram of the calculation device.

Firstly, the calculation device is explained. FIG. 15 shows a block diagram of the calculation device. As shown in FIG. 15, the calculation device 1 of the present embodiment includes the detecting unit 101, the position calculating unit 102, the initial velocity calculating unit 103, and the hitting angle calculating unit 104. These are the same as in Embodiment 1. With respect to the calculation device 1 of the present embodiment, the position calculating unit 102 further includes the existence straight line calculating unit 107 and the existence surface calculating unit 108 inside thereof. With respect to this point, it is different from the configuration of Embodiment 1.

To the calculation device 1 of the present embodiment, the information of the plurality of image frames taken (or captured) from above with the monocular camera is provided, as input from the outside. The information of the image frames includes information to calculate time intervals between respective image frames having been taken and the order of image frames having been taken. Specifically, it includes frame numbers indicating the order of taking the image frames and times when the respective image frames were taken and so on. And the calculation device 1 outputs information with respect to the initial velocity and the hitting angle of the target moving body to the outside. These are the same as in Embodiment 1.

The calculation device 1 of the present embodiment may not only be configured as a stand-alone device, but also may be incorporated into another device for use, and the other device incorporating the calculation device 1 may be an electric device such as a smartphone, an information mobile terminal, a digital camera, a game terminal, and an electric appliance such as a television. The calculation device 1 is configured to be the computer physically including the central processing unit (CPU) 201, the input device 202, the output device 203, the main memory (RAM/ROM) 204, the auxiliary storage device 205 as shown in FIG. 2. These are the same as in Embodiment 1.

Each function of the calculation device 1 of the present embodiment may be realized by causing the central processing unit (CPU) 201, the main memory (RAM/ROM) 204, and so on as shown in FIG. 2 to read a calculation program to make the computer calculate an initial velocity and a hitting angle of the target moving body having been shot from information of a plurality of image frames taken (or shot) from above with a monocular camera and to make the input device 202 and the output device 203 operate under control of the central processing unit (CPU) 201 as well as to make the main memory (RAM/ROM) 204 and the auxiliary storage device 205 read and write the data. These are the same as in Embodiment 1.

In accordance with the block diagram of FIG. 15, a function of each block of the calculation device 1 of the present embodiment will be explained. Here, details of each block will be described later.

The functions of the detecting unit 101, the initial velocity calculating unit 103, and the hitting angle calculating unit 104 are the same as in Embodiment 1. Therefore, the explanation is omitted.

The position calculating unit 102 calculates the three-dimensional position of the target moving body detected by the detecting unit 101. The position calculating unit 102 includes the existence straight line calculating unit 107 to calculate the existence straight line connecting the three-dimensional position of the optical center of the lens of the monocular camera and the three-dimensional position of the image of the target moving body taken (or captured) in the image frame; and the existence surface calculating unit 108 to calculate the existence surface on which the target moving body may exist with some probability. The position calculating unit 102 calculates the three-dimensional position of the point at which the existence straight line calculated by the existence straight line calculating unit 107 and the existence surface calculated by the existence surface calculating unit 108 intersect. Here, concrete calculating processes will be described later.

Next, the coordinate systems and so on to be used in explanation of the present embodiment are explained. As explained in Embodiment 1 with reference to FIGS. 3, 4, 5, and 6, the three-dimensional orthogonal coordinate system ΣXYZ in the real three-dimensional space, the two-dimensional orthogonal coordinate system Σuv in the image frame, and the three-dimensional orthogonal coordinate system Σxyz having the origin Pc at the optical center of the lens of the monocular camera are also used in the explanation of the present embodiment. In order to avoid the overlapped explanation, detailed explanation with respect to the coordinate systems and so on with reference to FIGS. 3, 4, 5, and 6 is omitted. Here, the plane 601 as shown in FIG. 6 will be described later in the explanation of the present embodiment.

Next, the operation of the calculation device 1 of the present embodiment is explained. FIG. 7 shows a flow chart illustrating the operation of the calculation device 1 of the present embodiment. The operation of the calculation device 1 of the present embodiment is explained in accordance with the flow chart of FIG. 7.

From the outside, information of the plurality of image frames taken (or captured) from above with the monocular camera which is subject to processing is input into the calculation device 1. The calculation device 1 starts to operate after the information subject to processing is input. The starting of operation may be made automatically after inputting the information or may be made by an explicit instruction. The calculation device 1 reads out the information of the respective image frames having been input and conducts processes of the flow chart depicted in FIG. 7.

With respect to the information of the image frames, the same applies as in Embodiment 1. The information of the image frames includes necessary information for calculation of the initial velocity in addition to the image information of the target moving body (golf ball) having been taken (or captured). In the present embodiment, the plurality of image frames subject to processing are explained to be those having been taken (or captured) consecutively and have information of consecutive frame numbers in the order of taking (or capturing) the image frames while the frame rate is constant (1/T).

Once the calculation device 1 starts to operate, the detecting unit 101 executes the detecting process (S701). In the detecting process (S701), the target moving body (golf ball) is detected from the information of the input image frames.

The same applies to the detecting process (S701) as in Embodiment 1. The method of detecting the target moving body (golf ball) from the information of the image frames may be any method as long as the two-dimensional coordinates of the target moving body (golf ball) in the image frame can be determined.

The detecting unit 101 detects the target moving body (golf ball) from the information of each of the image frames having been input, and once the two-dimensional coordinates in the image frame are determined, the detecting process (S701) is terminated. When the detecting process (S701) ends, the position calculating unit 102 starts the position calculation process (S702).

The present embodiment is different from Embodiment 1 in the position calculation process (S702). In the position calculating process (S702) in the present embodiment, the existence straight line connecting the three-dimensional position of the optical center of the lens of the monocular camera and the three-dimensional position of the image of the target moving body having been taken (or captured) in the image frame is calculated from the information of the image frames in which the three-dimensional position of the target moving body was taken (or captured) from above with the monocular camera; the existence surface on which the target moving body may exist with some probability is calculated; and the three-dimensional position of the point at which the existence straight line and the existence surface intersect is calculated as the three-dimensional position of the target moving body. In addition, in the present embodiment, with respect to the calculation of the three-dimensional position of the target moving body, the candidate three-dimensional position at which the target moving body may exist with the highest probability is calculated as the three-dimensional position of the target moving body from a plurality of candidate three-dimensional positions at which the target moving body may exist with some probability through the search algorithm.

In the position calculating process (S702) of the present embodiment, three-dimensional positions of respective points from the starting point to the ending point of the target moving body (golf ball) are calculated in the real three-dimensional space from two-dimensional coordinates of the respective points in the image frame where their positions are determined in the detecting process (S701). Here, the starting point and the ending point have the same meaning as the starting point and the ending point used in the explanation of Embodiment 1. And, with respect to the reference point used in the explanation of Embodiment 1, the same term having the same meaning is used in the present embodiment.

FIG. 8 shows a schematic diagram simplified for the purpose of general explanation of the position calculating process (S702). With respect to FIG. 8, the same applies in the present embodiment as in Embodiment 1. In order to avoid duplicated explanation, detailed explanation of FIG. 8 is omitted. Here, in the position calculating process (S702) of the present embodiment, the calculation is made by approximating the motion of the target moving body (golf ball) as the uniform linear motion in the same way as in Embodiment 1. In the following, the position calculating process (S702) will be explained using an example of calculation of the three-dimensional position of the target moving body (golf ball) in the real three-dimensional space in FIG. 8.

Figure 16:
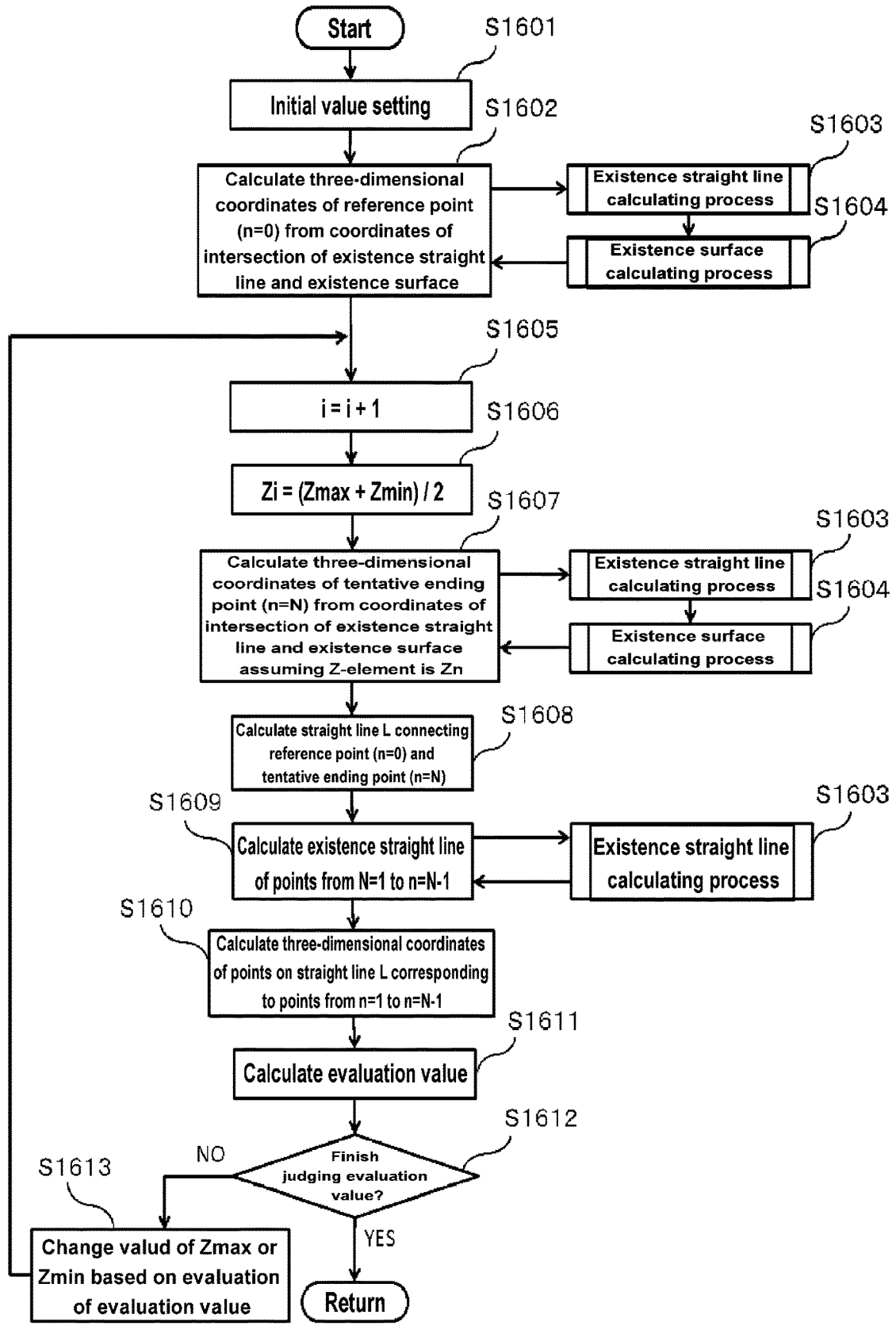
FIG. 16 shows a flow chart for a position calculating process.

FIG. 16 shows a flow chart of the position calculating process (S702) of the present embodiment. The position calculating process (S702) is explained with reference to the flow chart of FIG. 16.

The position calculating unit 102 conducts an initialization as the process of S1601 when the position calculating process (S702) is started. In the position calculating process (S702), a three-dimensional position of of the target moving body (golf ball) at each point from the starting point to the ending point along the trajectory is calculated in the real three-dimensional space through the search algorithm. In the position calculating process (S702) of the present embodiment, it is disclosed that the three-dimensional position of the target moving body (golf ball) is calculated in the real three-dimensional space through a dichotomic search that is a typical search algorithm. Here, the dichotomic search is just an example and the search algorithm is not limited to the dichotomic search in the invention of the present application. Other search algorithms such as a linear search and an interpolation search may be utilized.

In the present embodiment, height (a value of Z component in the coordinate system ΣXYZ) is used as a parameter in the dichotomic search. In the explanation of the position calculating process (S702), a value of the lower limit and a value of the upper limit for the height are represented by Zmin and Zmax, respectively, when conducting the dichotomic search. In the process of S1601 of the present embodiment, Zmin and Zmax are set as the initial values of the parameters of the dichotomic search. In the present embodiment, it is assumed that Zmin is a value r of the radius of the golf ball. The r is the height of the reference point that is the center of the target moving body (golf ball) 802 placed in contact with the ground surface 801. And Zmax is set to the height of the position of the optical center of the lens of the monocular camera from the ground surface. In the present embodiment, it is assumed that the position of the monocular camera is fixed and the coordinates of the optical center of the lens of the monocular camera in the coordinate system ΣXYZ are known. In this case, Zmax is the Z component of the coordinates of the position of the optical center of the lens of the monocular camera. Here, it should be understood that the determination of the lower limit of Zmin and the upper limit of Zmax is merely an example and it is not limited thereto in the invention of the present application. For example, it may be assumed that the lower limit Zmin may be the height of the ground surface (Zmin=0). And, in the process of S1601 of the present embodiment, an initial value of the counter (i) that indicates the number of searches in the dichotomic search is set to zero (0). When the initial values of the parameters are set, the process of S1601 is terminated and the process of S1602 is started.

In the process of S1602, the three-dimensional coordinates of the starting point is calculated from the intersection of the existence straight line and the existence surface. Here, the existence straight line is referred to as a three-dimensional straight line connecting the optical center of the lens of the monocular camera and the image of the target moving body taken (or captured) in the image frame. The target moving body exists on the existence straight line. And, then, the existence surface is referred to as a three-dimensional plane or curved surface on which the target moving body may exist with some probability.

With reference to FIG. 6, the relationship between the existence straight line and the existence surface is explained. The image of the target moving body (golf ball) P taken (or captured) in the image frame 401 is denoted by P'. The optical center of the lens of the monocular camera is denoted by Pc. Thus, in FIG. 6, the existence straight line is a three-dimensional straight line connecting P' and Pc and the target moving body (golf ball) P should exist on the straight line. And, in FIG. 6, a plane which is parallel to the XY plane of the coordinate system ΣXYZ and on which the target moving body (golf ball) P exists is set as the existence surface 601. At this time, the target moving body (golf ball) P exists at the intersection of the existence straight line and the existence surface.

With respect to the calculation of the existence straight line of the target moving body (golf ball), the existence straight line calculating unit 107 executes the existence straight line calculating process (S1603) for the calculation. And the calculation of the existence surface of the target moving body (golf ball) is achieved by making the existence surface calculating unit 108 execute the existence surface calculating process (S1604) for the calculation.

With reference to FIG. 6, the calculation of the existence straight line of the target moving body (golf ball) through the existence straight line calculating process (S1603) is explained.

FIG. 6 shows a diagram illustrating an situation that the target moving body (golf ball) P is taken (or captured) with the monocular camera. The three-dimensional position of the target moving body (golf ball) P in the three-dimensional orthogonal coordinate system ΣXYZ is set to P(X, Y, Z). The target moving body (golf ball) is taken (or captured) as an image P' in the image frame 401 with the monocular camera having the optical center of the lens of the monocular camera at the origin Pc of the three-dimensional orthogonal coordinate system Σxyz. The two-dimensional position of the image P' in the image frame 401 in the two-dimensional orthogonal coordinate system Σuv is set to P'(u, v).

In FIG. 6, with respect to the optical center of the lens of the monocular camera, the three-dimensional position in the three-dimensional orthogonal coordinate system ΣXYZ is set to Pc(X0, Y0, Z0). The z-axis of the three-dimensional coordinate system Σxyz having the optical center of the lens of the monocular camera at the origin Pc corresponds to the optical axis. The optical axis is orthogonal to the image frame 401 and the intersection thereof is to be the origin Q of the two-dimensional orthogonal coordinate system Σuv in the image frame. The two-dimensional position of the origin Q are set to Q(u0, v0). The distance between the origin of the three-dimensional orthogonal coordinate system Σxyz and the origin of the two-dimensional orthogonal coordinate system Σuv is the focal length and the length of the focal length is denoted by f.

In FIG. 6, the position of the image P' viewed from the three-dimensional orthogonal coordinate system Σxyz having the optical center of the lens of the monocular camera as the origin Pc is P'(u−u0, v−v0, f). Here, it is assumed that k is a proportional constant and that a coordinate transformation matrix from the three-dimensional orthogonal coordinate system Σxyz having the optical center of the lens of the monocular camera at the origin Pc to the three-dimensional orthogonal coordinate system ΣXYZ in the real three-dimensional space is R. In the present embodiment, the coordinate transformation matrix R may be determined if the rotation and the position coordinates of the camera in the three-dimensional orthogonal coordinate system ΣXYZ are given in the three-dimensional space.

The rotation is a so-called external parameter of the lens and rotation angle parameters of the three axes when converting from the coordinate system Σxyz to the coordinate system ΣXYZ in FIG. 6. In the present embodiment, it is explained that the calculation program of the present application is implemented into the equipment such as a so-called smartphone including an acceleration sensor such that the calculation device of the present application is configured and the value of the rotation is determined by the measured value by the acceleration sensor. The optical axis of the lens is determined by determining the value of the rotation. In FIG. 6, the z-axis of the coordinate system Σxyz is the optical axis.

And, in the present embodiment, it is assumed that the so-called internal parameters (focal length, lens distortion, and misalignment of the optical center of the lens) of the lens are known. As mentioned above, the distance between the origin of the coordinate system Σuv and the optical center (the origin of the coordinate system Σxyz) of the lens of the monocular camera in FIG. 6 is the focal length and the length of the focal length is denoted by f. And it is also assumed that there are no lens distortion or misalignment of the optical center of the lens.

In the three-dimensional orthogonal coordinate system Σxyz having the optical center of the lens of the monocular camera at the origin Pc, since the optical center of the lens of the monocular camera, the image P', and the target moving body (golf ball) P exist on the same straight line, the following formula (Formula 7) may be satisfied.

$$P(X,Y,Z) = Pc(X0,Y0,Z0) + kRP'(u-u0, v-v0, f) \quad \text{(Formula 7).}$$

Here, in the present embodiment, u−u0 and v−v0 that are the X component and the Y component of P' can be obtained from the coordinates of the two-dimensional position which are transferred to the position calculating unit 102 by the detecting unit 101 and f is the focal length, which is known.

The above-presented formula (Formula 7) is a formula of a straight line in the three-dimensional orthogonal coordinate system ΣXYZ, the straight line connecting the target moving body (golf ball) P, the image P', and the optical center of the lens of the monocular camera in the three-dimensional orthogonal coordinate system Σxyz. The straight line represented by Formula 7 is the existence straight line. When the target moving body (golf ball) P was taken (or captured) with the monocular camera having the optical center of the lens at the origin of the three-dimensional orthogonal coordinate system Σxyz, if the two-dimensional coordinates of the image P' in the image frame 401 in the two-dimensional orthogonal coordinate system Σuv can be determined, then, Formula 7 can be calculated such that the target moving body (golf ball) P exists on the straight line represented by Formula 7 in the three-dimensional orthogonal coordinate system ΣXYZ.

The existence straight line calculating unit 107 calculates the existence straight line represented by Formula 7 with respect to the target moving body (golf ball) by executing the above-mentioned existence straight line calculating process (S1603).

Next, with reference to FIG. 6, the calculation of the existence surface of the target moving body (golf ball) in the existence surface calculating process (S1604) is explained. In the existence surface calculating process (S1604), when the height (a value of the Z component in the coordinate system ΣXYZ) given as a parameter is H, a plane having Z=H and being parallel to the XY plane in the three-dimensional orthogonal coordinate system ΣXYZ is output as the existence surface.

In FIG. 6, with respect to the target moving body (golf ball) P, the three-dimensional coordinates in the coordinate system ΣXYZ are set to P(X1, Y1, H). In this case, the plane that is parallel to the XY plane in the coordinate system ΣXYZ and has Z=H is the existence surface 601 with respect to the target moving body (golf ball) P.

At this time, if the value H of the Z component of the coordinate system ΣXYZ with respect to the target moving body (golf ball) P is a correct value as a value of the Z component in the coordinate system ΣXYZ with respect to the target moving body (golf ball) P as the real body in the real three-dimensional space, the intersection of the existence surface plane 601 with respect to the target moving body (golf ball) P and the existence straight line with respect to the target moving body (golf ball) P that is represented by Formula 7 is the correct three-dimensional position of the target moving body (golf ball) P in the real three-dimensional space.

As mentioned above, in the present embodiment, the position calculating process (S702) executed by the position calculating unit 102 calculates the three-dimensional position of the target moving body (golf ball) in the real three-dimensional space through the dichotomic search utilizing the height (the value of the Z component in the coordinate system ΣXYZ) of the target moving body (golf ball) as the parameter. In consideration of the above-mentioned explanation with reference to FIG. 6, the position calculating process (S702) executed by the position calculating unit 102 in the present embodiment is again explained as follows: while the height (the value of the Z component in the coordinate system ΣXYZ) of the target moving body (golf ball) is used as a parameter, the position calculating process (S702) executed by the position calculating unit 102 calculates the three-dimensional position of the target moving body (golf ball) in the real three-dimensional space by searching the height, through the dichotomic search, such that the intersection of the existence straight line calculated by the existence straight line calculating unit 107 in the existence straight line calculating process (S1603) and the existence surface having the height given as the parameter calculated by the existence surface calculating unit 108 in the existence surface calculating process (S1604) has the height (the value of the Z component in the coordinate system ΣXYZ) that is regarded as the correct three-dimensional position of the target moving body (golf ball) in the real three-dimensional space.

The explanation returns to the process of S1602 of FIG. 16. In the process of S1602, the three-dimensional coordinates of the reference point are calculated from the intersection of the existence straight line and the existence surface. In the present embodiment, as mentioned above, the height (the value of the Z component in the coordinate system ΣXYZ) of the position of the reference point is the value r of the radius of the golf ball and the lower limit of the height is set to the initial value of Zmin when conducting the dichotomic search in the process of S1601. In the process of S1602, the lower limit of Zmin that is the height (the value of the Z component in the coordinate ΣXYZ) of the position of the reference point is transferred to the existence straight line calculating unit 107 and the existence surface calculating unit 108 together with other information (the two-dimensional coordinates of the image of the starting point on the image frame in the two-dimensional orthogonal coordinate system Σuv, the number of one (1) assigned to the starting point, and so on) necessary for the calculation; the existence straight line calculating process (S1603) and the existence surface calculating process (S1604) are executed; and the three-dimensional coordinates of the intersection of the calculated existence straight line and existence surface are determined. And, as explained with reference to FIG. 3, in the present embodiment, the coordinate system ΣXYZ has the origin O at the contact point of the golf ball and the ground surface such that the coordinates of the reference point are (0, 0, r). From this, the process to improve the calculation accuracy may be conducted by comparing and correcting the three-dimensional coordinates of the intersection of the calculated existence straight line and existence surface and the coordinates (0, 0, r) of the position of the starting point determined by the definition of the coordinate system ΣXYZ. In the process of S1602, when the three-dimensional coordinates of the reference point are calculated, the process of S1602 is terminated and the process of S1605 is started.

The processes from S1605 to S1613 correspond to the dichotomic search. The position calculating unit 102 selects the candidate of the three-dimensional position having the highest probability that the target moving body (golf ball) may exist thereat from a plurality of candidates of three-dimensional positions where the target moving body (golf ball) may possibly exist by the dichotomic search and calculates the candidate as the three-dimensional position of the target moving body (golf ball) through the position calculating process (S702).

In the process of S1605, one (1) is added to the counter (i) indicating the number of searches in the dichotomic search such that the counter is counted up. Next, in the process of S1606, the height Zi (the value of the Z component in the coordinate system ΣXYZ) of the three dimensional position of the target moving body (golf ball) in the real three-dimensional space to be searched is set as Zi=(Zmax+Zmin)/2. The suffix "i" of "Zi" represents the number of searches in the dichotomic search. In the initial value in the dichotomic search, Zi is set to the value of the middle point between the height of the optical center of the lens of the monocular camera and the height (r) of the center of the golf ball in contact with the ground surface.

In the process of S1607, the three-dimensional coordinates of the intersection of the existence straight line and the existence surface are calculated assuming the height (the value of the Z component in the coordinate system ΣXYZ) of the three dimensional position of the ending point in the real three-dimensional space is Zi. This is referred to as a tentative ending point. In the process of S1607, Zi=(Zmax+Zmin)/2 that is the height (the value of the Z component in the coordinate system ΣXYZ) of the position of the tentative ending point is transferred to the existence straight line calculating unit 107 and the existence surface calculating unit 108 together with other information (the two-dimensional coordinates of the image at the ending point on the image frame in the two-dimensional orthogonal coordinate system Σuv, the number of N assigned to the ending point, and so on) necessary for the calculation; the existence straight line calculating process (S1603) and the existence surface calculating process (S1604) are executed; and the three-dimensional coordinates of the intersection of the calculated existence straight line and existence surface are determined. In the S1607 process, when the three-dimensional coordinates of the tentative ending point is calculated, the process of S1607 is terminated and the process of S1608 is started.

Figure 17:
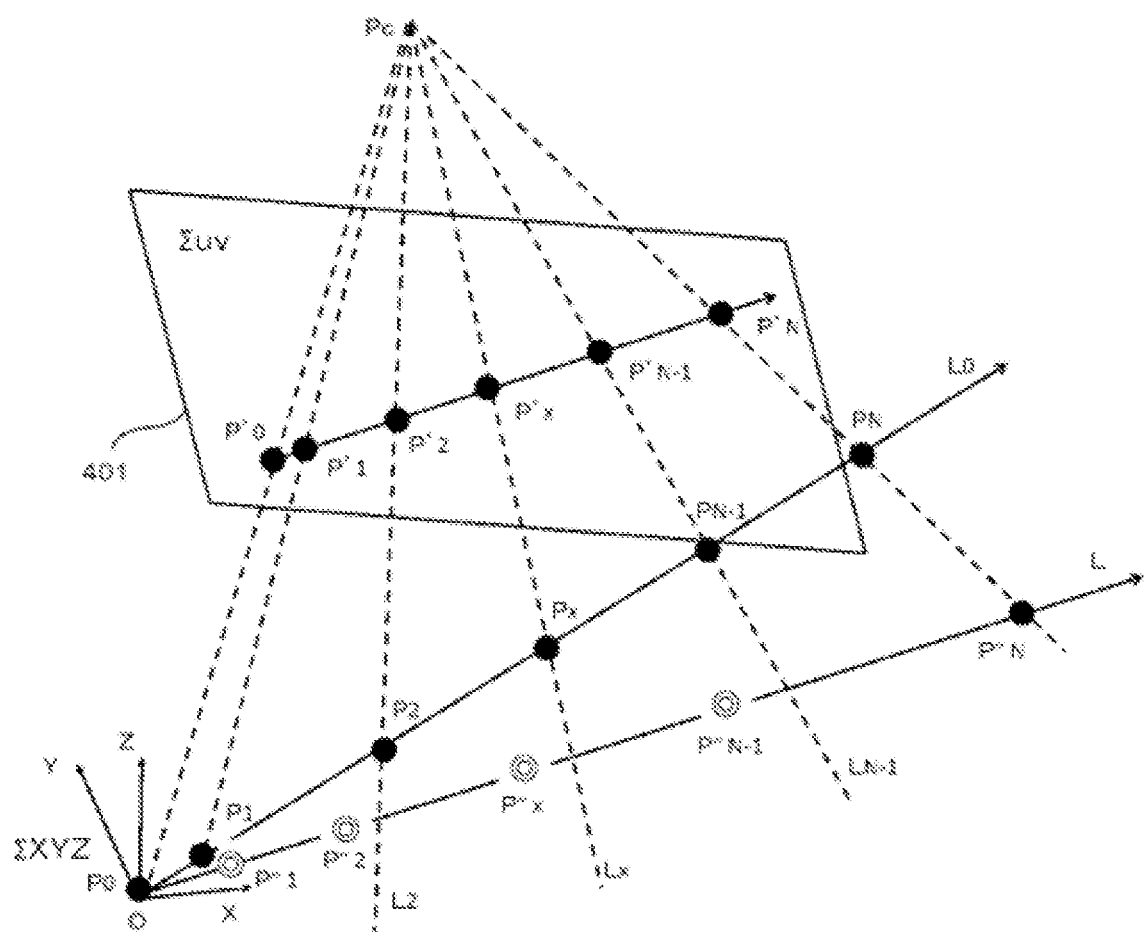
FIG. 17 shows a diagram illustrating part of a position calculating process.

FIG. 17 shows a diagram illustrating the processes from S1608 to S1611. In FIG. 17, L0 indicates the trajectory of the target moving body (golf ball) in the real three-dimensional space. The trajectory L0 is supposed to be part of the parabola, but it is processed by approximating it is linear in the position calculating process (S702) since it is only a short period of time immediately after the shot. The notation of P0 indicates the reference point in the real three-dimensional space; the notation of P1 indicates the actual starting point in the real three-dimensional space; and the notation of PN indicates the actual ending point in the real three-dimensional space. The notation of Px indicates the position of the target moving body (golf ball) in the real three-dimensional space taken (or captured) in the x-th image frame (where x is a natural number that is at least 2 and not exceeding N−1).

In FIG. 17, the notation of P'0 indicates the image of the reference point P0 on the image frame 401; the notation of P'1 indicates the image of the starting point P1 on the image frame 401; and the notation of P'N indicates the image of the ending point PN on the image frame 401. The notation of P'x indicates the x-th image of the target moving body (golf ball) Px on the image frame 401.

In FIG. 17, the notation of Pc indicates the optical center of the lens of the monocular camera and the notation of Lx indicates the existence straight line with respect to the x—the image P'x of the target moving body (golf ball) on the image frame 401.

In FIG. 17, the notation of P"N indicates a tentative ending point where the value of the Z component in the coordinate system ΣXYZ is Zi=(Zmax+Zmin)/2. In FIG. 16, in the process of S1608, a straight line L connecting the reference point P0 and the tentative ending point P"N is calculated. In FIG. 17, if the tentative ending point P"N and the actual ending point PN have the same three-dimensional position, then the straight line L0 and the straight line L are also the same such that the x-th target moving body (golf ball) Px should exists on the straight line L. On the other hand, if the tentative ending point P"N and the actual ending point PN in the real three-dimensional space do not have the same three-dimensional position, the straight line L0 and the straight line L are not the same such that the x-th target moving body (golf ball) Px does not exist on the straight line L.

Figure 18:
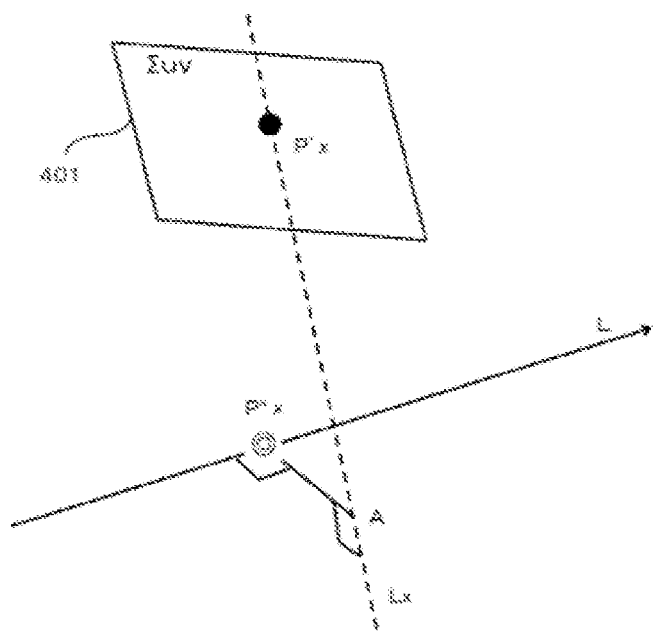
FIG. 18 shows a diagram illustrating a state where an existence straight line and a trajectory are in skew position.

Returning to FIG. 16, in the process of S1609, the existence straight line Lx with respect to the image P'x of the target moving body (golf ball) Px other than the reference point P'0 and the ending point P'N on the image frame 401 is calculated by executing the existence straight line calculating process (S1603). As mentioned above, if the tentative ending point P"N and the actual ending point PN do not have the same three-dimensional position in the real three-dimensional space, the straight line L0 and the straight line L are not the same such that the x-th target moving body (golf ball) Px does not exist on the straight line L. That is, the existence straight line Lx calculated in the process of S1609 and the straight line L are skew lines in the real three-dimensional space and do not intersect. FIG. 18 shows a diagram illustrating such a situation.

In the process of S1610, it is assumed that the straight line L is the trajectory of the target moving body (golf ball) and the three-dimensional coordinates of a tentative existence point P"x on the straight line L which is a point corresponding to the image P'x of the target moving body (golf ball) Px other than the reference point P'0 and the ending point P'N on the image frame 401 are calculated. The three-dimensional coordinates of the tentative existence point P"x are calculated by determining a point on the straight line L such that the distance between the straight line L and the existence straight line Lx is minimized, that is, by determining the position of the tentative existence point P"x such that the tentative existence point P"x on the straight line L and a point A on the existence straight line Lx are mutually feet of the perpendicular lines as shown in FIG. 18. When positions of tentative existence points P"x from X=1 to X=N−1 are calculated, the process of S1610 is terminated and it proceeds to the process of S1611.

The processes of S1611 and S1612 are evaluation and judgment processes. The degree of agreement between the straight line L obtained from the tentative existence points P"x and the straight line L0 of the trajectory of the target moving body (golf ball) in the real three-dimensional space is evaluated and it is judged whether the tentative existence points P"x are considered to be at actual three-dimensional positions Px of the target moving body (golf ball).

In the process of S1611, an evaluation value to evaluate the degree of agreement between the straight line L and the actual trajectory L0 of the target moving body (golf ball) is calculated from the three-dimensional coordinates of the reference point P0, which exists on the straight line L, three-dimensional coordinates of the tentative ending point P"N, and three-dimensional coordinates of the tentative existence points P"x (x is a natural number that is at least one (1) and not exceeding N−1). In the present embodiment, a mean value of distances between mutually-neighboring tentative existence points with respect to the respective tentative existence points from the tentative existence point P"1 to the tentative existence point P"N−1 is calculated as the evaluation value.

In the present embodiment, in the process of S1612, the evaluation value calculated in the process of S1611 and the distance between the tentative existence point P"N−1 and the tentative ending point P"N are compared such that a judgment is made. Specifically, in the present embodiment, when the following formula (Formula 8) is satisfied, it is judged that the degree of agreement between the straight line L obtained from the tentative existence points P"x and the straight line L0 of the actual trajectory of the target moving body (golf ball) in the real three-dimensional space is high. Here, in the formula (Formula 8), the distance between the tentative existence point P"N−1 and the tentative ending point P"N is referred to as "tentative ending point distance".

$$|(\text{tentative ending point distance} - \text{evaluation value})/\text{tentative ending point distance}| \times 100 < 1 \quad \text{(Formula 8)}.$$

In the process of S1612, when it is judged that the degree of agreement between the straight line L and the actual trajectory L0 of the target moving body (golf ball) is high, the three-dimensional coordinates of the tentative existence point P"x are calculated as the three-dimensional coordinates of the corresponding target moving body (golf ball) Px and the position calculating process (S702) is terminated. On the other hand, when the degree of agreement between the straight line L and the actual trajectory L0 of the target moving body (golf ball) is not high, the process of S1613 is started.

In the process of S1613, based on the evaluation of the evaluation value in the process of S1612, the value of the upper limit Zmax of the height or the value of the lower limit Zmin of the height is changed in conducting the dichotomic search. When it is judged that the degree of agreement is not high because the distance (tentative ending point distance) between the tentative existence point P"N−1 and the tentative ending point P"N is smaller than the evaluation value (the mean value of distances between mutually-neighboring tentative existence points with respect to the respective tentative existence points from the tentative existence point P"1 to the tentative existence point P"N−1), the value of the upper limit Zmax of the height is changed to the value of the height Zi (the value of Z component in the coordinate system ΣXYZ) of the tentative ending point. On the other hand, when it is judged that the degree of agreement is not high because the tentative ending point distance is larger than the evaluation value, the value of the lower limit Zmin of the height is changed to the value of the height Zi (the value of Z component in the coordinate system ΣXYZ) of the tentative ending point.

In the process of S1613, when the upper limit Zmax of the height or the lower limit Zmin of the height is changed in the dichotomic search, the process of S1613 is terminated, and the dichotomic search is successively executed from the process of S1605.

Here, the evaluation and judgment processes of S1611 to S1613 disclosed herein are shown by way of example such that other methods may be employed as long as the appropriated evaluation and judgment can be made and they are not limited to these in the invention of the present application.

Returning to FIG. 7, when the position calculating process (S702) is terminated, the initial velocity calculating unit 103 executes the initial velocity calculating process (S703) and the hitting angle calculating unit 104 executes the hitting angle calculating process (S704), respectively. Since the initial velocity calculating process (S703) and the hitting angle calculating process (S704) are the same as in Embodiment 1, the explanation thereof is omitted.

The calculation device 1 outputs the initial velocity calculated by the initial velocity calculating unit 103 in the initial velocity calculating process (S703) and the hitting angle calculated by the hitting angle calculating unit 104 in the hitting angle calculating process (S704).

Figure 19:
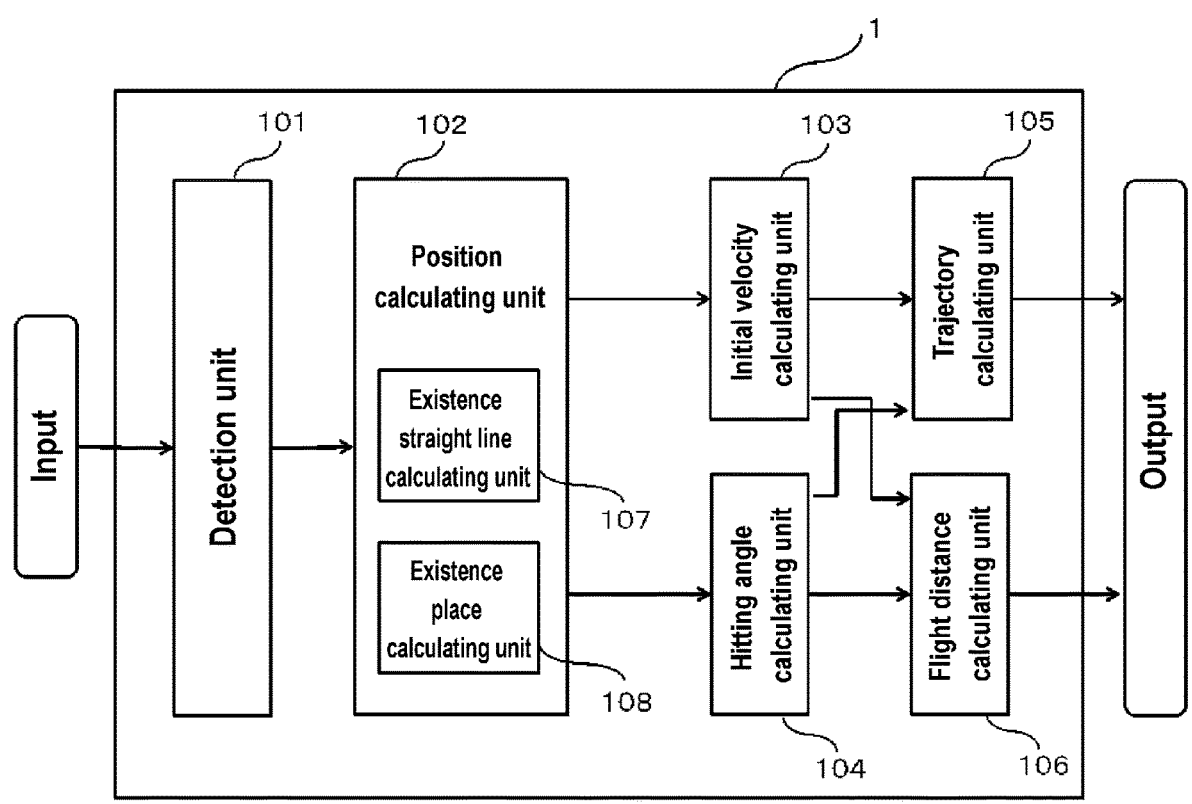
FIG. 19 shows a block diagram of the calculation device.

The calculation device 1 may include, as shown in FIG. 19, the trajectory calculating unit 107 and the flight distance calculating unit 106. Since the functions of the trajectory calculating unit 105 and the flight distance calculating unit 106 are the same or similar as in Embodiment 1, explanation thereof is omitted.

The aforementioned is the explanation of the calculation device.

Next, the explanation will be made with respect to the calculation system. The calculation system includes the monocular camera arranged at the position where the target moving body is taken from above with the monocular camera and the above-mentioned calculation device. The monocular camera and the calculation device may be mutually separate or may be configured to constitute the system as a unit. In the system where the monocular camera and the calculation device are mutually separate, the monocular camera and the calculation device may be connected to the wired or wireless communication network such that the taken (or captured) image data may be successively transferred or be one-time accumulated and then transferred, or the captured image data may be stored in a storage medium or the like and thus-stored date may be transferred to the calculation device. And in the system where the monocular camera and the calculation device are integrally unified, for example, a system may be configured to be a unified system of the monocular camera and the calculation device by making information equipment such as a smartphone with a built-in monocular camera work as the calculation device since a later-described calculation program is provided thereto as an application or else.

Next, the calculation program will be explained in order to make the computer work as the calculation device. The configuration of the computer is as shown in FIG. 2.

The calculation program includes a main module, an input-output module, and an arithmetic processing module. The main module is a part that controls overall processes. The input-output module makes the computer obtain input information such as image data and makes the computer output calculated information as a numerical value and an image. The arithmetic processing module includes a detecting module, a position calculating module, an initial velocity calculating module, a hitting angle calculating module, a trajectory calculating module, a flight distance calculating module, an existence straight line calculating module, and an existence surface calculating module. The functions realized by executing the main module, the input-output module, and the arithmetic processing module are the same or similar as those of the detecting unit 101, the position calculating unit 102, the initial velocity calculating unit 103, the hitting angle calculating unit 104, the trajectory calculating unit 105, and the flight distance calculating unit 106 of the calculation device 1, respectively.

The calculation program is provided by a storage medium or semiconductor memory such as ROM. The calculation program may also be provided through the network.

The aforementioned description is the explanation of Embodiment 2.

AS mentioned above, according to the calculation device, the calculation system, the calculation method, and the calculation program of the present application, in an athletic competition such as golf, the initial velocity and the hitting angle of the target moving body such as a ball having been hit high with equipment such as a golf club can be calculated from information of a plurality of image frames taken from above where the target moving body can be easily detected from the background. Thus, the trajectory and the flight distance of the target moving body can be calculated with high accuracy from images taken (or captured) with the monocular camera having low resolution.

What is claimed is:

1. A calculation device of a motion of a target moving body, comprising:
    a detecting unit that detects an image of the target moving body from information of each of a plurality of image frames, in which the image of the target moving body is captured, the plurality of image frames being consecutively taken from above with a constant time interval with a monocular camera;
    a position calculating unit that calculates a three-dimensional position of the image from a two-dimensional position of the image in the each of the image frames and a three-dimensional position of an optical center of a lens of the monocular camera by approximating the motion of the target moving body as a uniform linear motion;
    an initial velocity calculating unit that calculates an initial velocity of the target moving body from the three-dimensional position of the image and the information of the image frames; and
    a hitting angle calculating unit that calculates a hitting angle of the target moving body from the three dimensional position of the image and the information of the image frames.

2. The calculation device according to claim 1,
    wherein the position calculating unit comprises:
    an existence straight line calculating unit that calculates an existence straight line connecting the three-dimensional position of the image and the three-dimensional position of the optical center of the lens; and
    an existence surface calculation unit that calculates an existence surface on which the image may exist with a probability,
    wherein the position calculating unit calculates, as the three-dimensional position of the image, a three-dimensional position of an intersection of the existence straight line and the existence surface.

3. The calculation device according to claim 2,
    wherein the position calculating unit selects a candidate of a three-dimensional position where the image may exist with a highest probability from a plurality of candidates of three-dimensional positions where the image may exist with a probability by a search algorithm and calculates, as a three-dimensional position of the image, the three-dimensional position of the selected candidate.

4. The calculation device according to claim 3,
    wherein the position calculating unit searches, through the search algorithm, the candidate of the three-dimensional position where the image may exist with the highest probability by evaluating an evaluation value obtained from a distance between three-dimensional positions where images may exist with probabilities, the images being captured in mutually-neighboring image frames, respectively.

5. The calculation device according to claim 1, comprising:
    a trajectory calculating unit that calculates a trajectory in three dimensions of the target moving body from the initial velocity of the target moving body and the hitting angle of the target moving body.

6. The calculation device according to claim 1, comprising:
    a flight distance calculating unit that calculates a flight distance of the target moving body from the initial velocity of the target moving body and the hitting angle of the target moving body.

7. A calculation system, comprising:
    a monocular camera arranged at a position where a target moving body is taken from above with the monocular camera; and
    a calculation device as defined in claim 1.

8. A calculation method of calculation of a motion of a target moving body, comprising the steps of:
    a detecting step of detecting an image of the target moving body from information of each of a plurality of image frames, in which the image of the target moving body is captured, the plurality of image frames being consecutively taken from above with a constant time interval with a monocular camera;
    a position calculating step of calculating a three-dimensional position of the image from a two-dimensional position of the image in the each of the image frames and a three-dimensional position of an optical center of a lens of the monocular camera by approximating the motion of the target moving body as a uniform linear motion;

an initial velocity calculating step of calculating an initial velocity of the target moving body from the three-dimensional position of the image and the information of the image frames; and a hitting angle calculating step of calculating a hitting angle of the target moving body from the three-dimensional position of the image and the information of the image frames.

9. A calculation device that calculates an initial velocity and a hitting angle of a target moving body, comprising:

a storage device capable of recording information;

an input device capable of inputting information;

a central processing unit capable of calculating based on information;

an output device capable of outputting a calculation result; and a wired or wireless communication line capable of transferring information to each component thereof;

wherein the central processing unit is operable to:

cause the input device to input information of a plurality of image frames having the target moving body consecutively taken therein from above with a predetermined time interval with a monocular camera and being recorded, the monocular camera being arranged at a position fixed above over an initial position of the target moving body, the target moving body being placed at the initial position when being shot therefrom, and information of the initial position and the position of the monocular camera;

cause the storage device to record the input information;

detect an image of the target moving body in each of the plurality of image frames based on information stored in the storage device;

calculate a three-dimensional position of the image of the target moving body from a two-dimensional position of the image in the each of the plurality of image frames and a three-dimensional position of an optical center of a lens of the monocular camera by approximating a motion of the target moving body as a uniform linear motion based on the information stored in the storage device; and calculate the initial velocity and the hitting angle of the target moving body from the calculated three-dimensional position of the target moving body.

10. The calculation device according to claim 9, wherein the central processing unit is operable to:

calculate an existence straight line connecting the three-dimensional position of the optical center of the monocular camera and the three-dimensional position of the image in a real three-dimensional space;

calculate an existence surface on which the image may exist with a probability; and calculated a three-dimensional position of an intersection of the existence straight line and the existence surface as the three dimensional position of the image.

11. The calculation device according to claim 9, wherein the central processing unit is operable to:

select a candidate of a three-dimensional position where the image may exist with a highest probability from a plurality of candidates of three-dimensional positions where the image may exist with a probability by a search algorithm; and calculate the three-dimensional position of the selected candidate as the three-dimensional position of the target moving body.

12. The calculation device according to claim 11, wherein the central processing unit is operable to:

search, through the search algorithm, the candidate of the three-dimensional position where the image may exist with the highest probability by evaluating an evaluation value obtained from a distance between three-dimensional positions where images may exist with probabilities, the images being captured in mutually-neighboring image frames, respectively.

13. The calculation device according to claim 9, wherein the central processing unit is operable to:

calculate a trajectory in three dimensions of the target moving body from the initial velocity and the hitting angle of the target moving body.

14. The calculation device according to claim 9, wherein the central processing unit is operable to:

calculate a flight distance of the target moving body from the initial velocity and the hitting angle of the target moving body.

* * * * *